US00RE47837E

(19) United States
(12) Reissued Patent
Barefoot et al.

(10) Patent Number: US RE47,837 E
(45) Date of Reissued Patent: Feb. 4, 2020

(54) CRACK AND SCRATCH RESISTANT GLASS AND ENCLOSURES MADE THEREFROM

(71) Applicant: Corning Incorporated, Corning, NY (US)

(72) Inventors: Kristen L. Barefoot, Corning, NY (US); Matthew John Dejneka, Corning, NY (US); Sinue Gomez, Corning, NY (US); Timothy Michael Gross, Corning, NY (US); Nagaraja Shashidhar, Painted Post, NY (US)

(73) Assignee: Corning Incorporated, Corning, NY (US)

(21) Appl. No.: 15/862,353

(22) Filed: Jan. 4, 2018

Related U.S. Patent Documents

Reissue of:
(64) Patent No.: 9,290,407
Issued: Mar. 22, 2016
Appl. No.: 14/082,847
Filed: Nov. 18, 2013

U.S. Applications:
(63) Continuation of application No. 12/858,490, filed on Aug. 18, 2010, now Pat. No. 8,586,492.
(Continued)

(51) Int. Cl.
*C03C 3/091* (2006.01)
*C03C 3/097* (2006.01)
(Continued)

(52) U.S. Cl.
CPC ..... *C03C 3/091* (2013.01); *C03B 33/0222* (2013.01); *C03B 33/04* (2013.01);
(Continued)

(58) Field of Classification Search
CPC ..... C03C 3/091; C03C 21/002; C03C 3/097; C03B 33/04; C03B 33/0222;
(Continued)

(56) References Cited

U.S. PATENT DOCUMENTS 3,357,876 A 12/1967 Rinehart
3,524,737 A 8/1970 Doyle et al.
(Continued)

FOREIGN PATENT DOCUMENTS

DE 10130214 A1 1/2003
GB 1329609 A 9/1973
(Continued)

OTHER PUBLICATIONS

Deriano et al. "Physical and mechanical properties of a new borosilicate glass", Ann. Chim. Sci. Mat. 28 (2003) p. 55-62.
(Continued)

*Primary Examiner* — Jerry D Johnson
(74) *Attorney, Agent, or Firm* — Pepper Hamilton LLP

(57) ABSTRACT

A glass and an enclosure, including windows, cover plates, and substrates for mobile electronic devices comprising the glass. The glass has a crack initiation threshold that is sufficient to withstand direct impact, has a retained strength following abrasion that is greater than soda lime and alkali aluminosilicate glasses, and is resistant to damage when scratched. The enclosure includes cover plates, windows, screens, and casings for mobile electronic devices and information terminal devices.

35 Claims, 8 Drawing Sheets

(a)

(b)

Related U.S. Application Data

(60) Provisional application No. 61/235,767, filed on Aug. 21, 2009.

(51) Int. Cl.

| | |
|---|---|
| ***C03B 33/02*** | (2006.01) |
| ***C03B 33/04*** | (2006.01) |
| ***C03B 33/09*** | (2006.01) |
| ***C03C 21/00*** | (2006.01) |

(52) U.S. Cl.
CPC ..... *C03B 33/091* (2013.01); *C03C 3/097* (2013.01); *C03C 21/002* (2013.01); *Y02P 40/57* (2015.11); *Y10T 225/12* (2015.04); *Y10T 428/24777* (2015.01); *Y10T 428/315* (2015.01)

(58) Field of Classification Search
CPC ..... C03B 33/091; Y02P 40/57; Y10T 225/12; Y10T 428/24777; Y10T 428/315
See application file for complete search history.

(56) References Cited

U.S. PATENT DOCUMENTS

| | | | | |
|---|---|---|---|---|
| 3,772,135 | A | 11/1973 | Nara et al. | |
| 3,954,487 | A | 5/1976 | Gliemeroth et al. | |
| 4,018,965 | A | 4/1977 | Kerko et al. | |
| 4,166,745 | A | 9/1979 | Araujo et al. | |
| 4,259,118 | A | 3/1981 | Sack | |
| 4,396,720 | A | 8/1983 | Beall et al. | |
| 4,549,894 | A | 10/1985 | Araujo et al. | |
| 5,219,801 | A | 6/1993 | Shorrock et al. | |
| 5,277,946 | A | 1/1994 | Nagai et al. | |
| 5,489,558 | A | 2/1996 | Moffatt et al. | |
| 5,674,790 | A | 10/1997 | Araujo | |
| 5,741,745 | A | 4/1998 | Sehgal et al. | |
| 5,770,535 | A | 6/1998 | Brix et al. | |
| 5,801,109 | A | 9/1998 | Nishizawa et al. | |
| 5,876,472 | A | 3/1999 | Gros et al. | |
| 6,066,273 | A | 5/2000 | Yamaguchi et al. | |
| 6,096,670 | A | 8/2000 | Lautenschlager et al. | |
| 6,187,429 | B1 | 2/2001 | Weinberg et al. | |
| 6,268,304 | B1 | 7/2001 | Maeda et al. | |
| 6,319,867 | B1 | 11/2001 | Chacon et al. | |
| 6,329,310 | B1 | 12/2001 | Peuchert et al. | |
| RE37,920 | E | 12/2002 | Moffatt et al. | |
| 6,818,576 | B2 | 11/2004 | Ikenishi et al. | |
| 6,831,029 | B2 | 12/2004 | Chacon et al. | |
| 6,960,545 | B2 | 11/2005 | Wolff et al. | |
| 7,341,966 | B2 | 3/2008 | Marques | |
| 7,482,296 | B2 | 1/2009 | Messerschmidt et al. | |
| 7,566,673 | B2 | 7/2009 | Kawai | |
| 7,666,511 | B2 | 2/2010 | Ellison et al. | |
| 8,168,295 | B2 | 5/2012 | Murata | |
| 8,232,218 | B2 | 7/2012 | Dejneka et al. | |
| 8,586,492 | B2 * | 11/2013 | Barefoot et al. | 501/66 |
| 8,652,978 | B2 * | 2/2014 | Dejneka et al. | 501/66 |
| 8,759,238 | B2 | 6/2014 | Chapman et al. | |
| 9,102,566 | B2 | 8/2015 | Sawada | |
| 2001/0038929 | A1 | 11/2001 | Uhlik et al. | |
| 2003/0045420 | A1 | 3/2003 | Koyama et al. | |
| 2003/0109370 | A1 | 6/2003 | Ikenishi et al. | |
| 2004/0048729 | A1 | 3/2004 | Bitossi et al. | |
| 2004/0132606 | A1 | 7/2004 | Wolff et al. | |
| 2005/0090377 | A1 | 4/2005 | Shelestak et al. | |
| 2005/0250639 | A1 | 11/2005 | Siebers et al. | |
| 2006/0238100 | A1 | 10/2006 | Miyata et al. | |
| 2008/0090717 | A1 | 4/2008 | Nagashima et al. | |
| 2008/0203894 | A1 | 8/2008 | Miyata et al. | |
| 2008/0250639 | A1 | 10/2008 | Yang | |
| 2008/0286548 | A1 | 11/2008 | Ellison et al. | |
| 2009/0129061 | A1 | 5/2009 | Fechner et al. | |
| 2009/0142568 | A1 | 6/2009 | Dejneka et al. | |
| 2009/0176038 | A1 | 7/2009 | Komori et al. | |
| 2009/0197048 | A1 | 8/2009 | Amin et al. | |
| 2009/0202808 | A1 | 8/2009 | Glaesemann et al. | |
| 2009/0220761 | A1 | 9/2009 | Dejneka et al. | |
| 2010/0045721 | A1 | 2/2010 | Schaum et al. | |
| 2010/0047521 | A1 | 2/2010 | Amin et al. | |
| 2010/0151210 | A1 | 6/2010 | Ahimatani | |
| 2010/0160141 | A1 | 6/2010 | Ikenishi et al. | |
| 2010/0285272 | A1 | 11/2010 | Koval et al. | |
| 2010/0285275 | A1 | 11/2010 | Baca et al. | |
| 2011/0014475 | A1 | 1/2011 | Murata | |
| 2011/0017297 | A1 | 1/2011 | Aitken et al. | |
| 2011/0201490 | A1 | 8/2011 | Barefoot et al. | |

FOREIGN PATENT DOCUMENTS

| | | | |
|---|---|---|---|
| JP | S4610430 | B1 | 3/1971 |
| JP | 47 -2274 | | 1/1972 |
| JP | 72002274 | B | 12/1974 |
| JP | 56104747 | A | 8/1981 |
| JP | 60141642 | A | 7/1985 |
| JP | 61053130 | A | 3/1986 |
| JP | 64042025 | A | 2/1989 |
| JP | 86442025 | A | 2/1989 |
| JP | 03237036 | A | 10/1991 |
| JP | 04083733 | A | 3/1992 |
| JP | 04119942 | A | 4/1992 |
| JP | 50069115 | A | 9/1993 |
| JP | 07053235 | A | 2/1995 |
| JP | 11310431 | A | 11/1999 |
| JP | 2001106545 | A | 4/2001 |
| JP | 03177333 | B2 | 6/2001 |
| JP | 2001305320 | A | 10/2001 |
| JP | 20662929 | A | 3/2006 |
| JP | 2006062929 | A | 3/2006 |
| JP | 2009203154 | A | 9/2009 |
| JP | 2011213576 | A | 10/2011 |
| WO | 2007079077 | A2 | 7/2007 |
| WO | 2009/070237 | | 6/2009 |
| WO | 2010021746 | A1 | 2/2010 |
| WO | 2010129624 | A1 | 11/2010 |

OTHER PUBLICATIONS

Gross et al. "A glass with high crack initiation load: Role of fictive temperature-independent mechanical properties" Journal of Non-Crystalline Solids 355 (2009) p. 563-568.

Hornberger et al. "Microstructure of a high strength alumina glass composite" Journal of Materials Research vol. 11 No. 4 (1996) p. 855-858.

Kingston et al. "Compositional effects on the fracture behavior of alkali-silicate glasses" Blackwell Science Ltd. Fatigue Fract Engng Mater Struct 23, p. 685-690.

Morris et al. "Indentation crack initiation in ion-exchanged aluminosilicate glass", Journal of Materials Science 39 (2004) 2399-2410.

Nakai et al. "Effect of aluminum ions on intrinsic sub-critical crack growth in metaohosphate glasses" Journal of Non-Crystalline Solids 353 (2007) p. 2250-2257.

Rizkalla et al. "Effect of Nonbridging Oxygens on the Fracture Toughness of Synthesized Glasses" Br. Ceramic Trans. 91 p. 12-15 (1992).

Seal et al. "Effect of phase separation on the fracture toughness of SiO2—B2O3—Na2O glass" Bull. Mater. Sci., vol. 28, No. 5, Aug. 2005, pp. 457-460.

Sehgal et al. "A new low-brittleness glass in the Soda-Lime-Silica glass family" Journal of the American Ceramic Society (9) p. 2485-2488 (1998).

Sehgal et al. "Brittleness of glass" Journal of Non-crystalline Solids 253 (1999) p. 126-132.

Simmons et al. "Effects of phase seperation on crack growth in borosilicate glass" Journal of Non-crystalline Solids, 38 & 39 (1980) p. 503-508.

Sugimura et al. "Compostitional Dependence of Mechanical Properties in Aluminosilicate, Borate and Phosphate Glasses" Journal of the Ceramic Society of Japan 110 (12) 1103-1106 (2002).

(56) References Cited

OTHER PUBLICATIONS

Taniguchi et al. "Deformation and fracture of soda-lime-silica glass under tension by molecular dynamics simulation" Journal of the Ceramic Society of Japan 116 (8) p. 885-889 (2008).
West et al. "Silica Fracture Part III: Five and six fold ring contraction models", Journal of Materials Science 30 (1995) p. 6281-6287.
Wilantewicz "Vickers Indentation fracture inoptical glass compositions" Alfred University, 21 pgs.
Yoshida et al. "Crack growth in the high crack velocity region for binary sodium silicate glasses" Journal of the Ceramic Society of Japan 108 (10) p. 948-951 (2000).
Yoshida et al. "Crack initiation behavior of sodium aluminosilicate glasses" Journal of Non-crystalline Solids 344 (2004) p. 37-43.
Appen and Fu-si, "electrical properties of aluminosilicate, borosilicate, and aluminum borosilicate glasses" Solid State Physics 1(1), 1959. pp. 1529-1537 (translation attached).
Levitsky and Papko, "effect of composition and structural factors on viscosity of borosilicate glasses and melts" Glass and Ceramics 2010, No. 11, pp. 6-9 (english translation attached).
Geisinger et al. "thermochemistry and structure of glasses along the join NaAlSi3O8-NaBSi3O8", Geochimica et Cosmochimica Acta, 1988, vol. 52, No. 10, p. 2405-2414.
Application No. 1533/DELNP/2012 Office Action dated Jul. 23, 2018, India Patent Office.
Deriano, S., "Physical and Mechanical Properties of a New Borosilicate Glass," Annales de chimie-science des materiaux 28 (2003) pp. 55-62.
Deubener, J.., "Crack tip fracture toughness of base glasses for dental restoration glass-ceramics using crack opening displacements," Journal of the Mechanical Behavior of biomedical Materials 4 (2011) pp. 1291-1298.
Wilantewicz, T., "The Effects of Lithium, Boron, and Magnesium Oxides on the Mechanical Properties of Silicate Glasses," M.S. Thesis, Alfred University, Jul. 1998, pp. 6-7, 38-47.
Wilantewicz, T., "Cract Initiation Behavior of Optical Glasses from Vickers Iniation", Ph.D. Thesis, Alfred University, Nov. 2005, pp. 27-39 and54-56.
Yoshida, S., "Crack Growth in the High Cract Velocity Region for Binary Sodium Silicate Glasses," Journal of the Ceramic Society of Japan 108 (2000) pp. 958-961.
Ito, Setsuro, "Structural Study on Mechanical Behavior of Glass," Journal of the Ceramic Society of Japan, 112 [9]pp. 577-485 (2004.
Kato, Yoshinari, "Effect of Densification on Crack Initiation under Vickers Indentation Test," Journal of Non-Crystalline Solids 356 (2010) pp. 1768-1773.
Rizkala, A.S., "Effect of Nonbridging Oxygens on the Fracture Toughness of Synthesized Glasses," Br. Ceram. Trans. J., 91, pp. 12-15, 1992.
Wilantewicz, Trevor, "Vickers Indentation Fracture in Optical Glass Compositions," Fractrography of Glasses and Ceramics V pp. 131-151.

* cited by examiner (a)

Prior Art a b

CRACK AND SCRATCH RESISTANT GLASS AND ENCLOSURES MADE THEREFROM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is *an application for reissue of U.S. Pat. No. 9,290,407, issued Mar. 22, 2016, filed as U.S. patent application Ser. No. 14/082,847 on Nov. 18, 2013, which is* a continuation application of U.S. patent application Ser. No. 12/858,490, filed Aug. 18, 2010, now U.S. Pat. No. 8,586,492, which claims the benefit of U.S. Provisional Application No. 61/235,767, filed Aug. 21, 2009.

BACKGROUND

The disclosure is related to glass enclosures, including windows, cover plates, and substrates for electronic devices. More particularly, the disclosure relates to crack- and scratch-resistant enclosures.

Glass is being designed into electronic devices, such as telephones, and entertainment devices, such as games, music players and the like, and information terminal (IT) devices, such as laptop computers. A predominant cause of breakage of cover glass in mobile devices is point contact or sharp impact. The solution for this problem has been to provide a bezel or similar protective structure to hold and protect the glass from such impacts. In particular, the bezel provides protection from impact on the edge of the glass. The edge of the cover glass is most vulnerable to fragmentation by direct impact. Incorporation of the bezel limits the use of glass to flat pieces in the device and prevents utilization of designs that exploit the crystal-like appearance of glass.

SUMMARY

A glass and a glass enclosure, including windows, cover plates, and substrates for mobile electronic devices comprising the glass are provided. The glass has a crack initiation threshold that is sufficient to withstand direct impact, a retained strength following abrasion that is greater than soda lime and alkali aluminosilicate glasses, and is more resistant to damage when scratched. The enclosure includes cover plates, windows, screens, touch panels, casings, and the like for electronic devices and information terminal devices. The glass can also be used in other applications, such as a vehicle windshield, where light weight, high strength, and durable glass is be desired.

Accordingly, one aspect of the disclosure is to provide an aluminoborosilicate glass comprising at least 50 mol % $SiO_2$ in some embodiments, at least 58 mol % $SiO_2$, in other embodiments, and at least 60 mol % $SiO_2$ in still other embodiments, and at least one modifier selected from the group consisting of alkali metal oxides and alkaline earth metal oxides. The aluminoborosilicate glass is ion exchangeable, and exhibits the ratio $$\frac{Al_2O_3\ (\text{mol }\%) + B_2O_3\ (\text{mol }\%)}{\sum \text{modifiers (mol }\%)} > 1.$$

A second aspect of the disclosure is to provide an aluminoborosilicate glass. The aluminoborosilicate glass comprises: 50-72 mol % $SiO_2$; 9-17 mol % $Al_2O_3$; 2-12 mol % $B_2O_3$; 8-16 mol % $Na_2O$; and 0-4 mol % $K_2O$, wherein the ratio $$\frac{Al_2O_3\ (\text{mol }\%) + B_2O_3\ (\text{mol }\%)}{\sum \text{modifiers (mol }\%)} > 1,$$

where the modifiers are selected from the group consisting of alkali metal oxides and alkaline earth metal oxides. The aluminoborosilicate glass is ion exchangeable.

A third aspect of the disclosure is to provide a glass enclosure for use in an electronic device. The glass enclosure comprises a strengthened glass that, when scratched with a Knoop diamond at a load of at least 5 N to form a scratch of width w, is free of chips having a size greater than three times the width w.

These and other aspects, advantages, and salient features will become apparent from the following detailed description, the accompanying drawings, and the appended claims.

DETAILED DESCRIPTION

Figure 1:
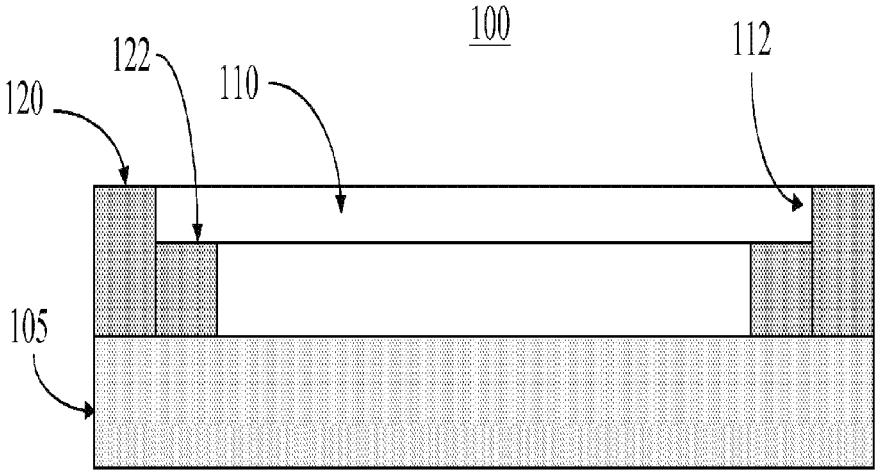
FIG. 1a is an schematic representation of a prior art glass cover plate held in place by a bezel.
FIG. 1b is a schematic representation of glass cover plate that is proud of the bezel.
Figure 1:
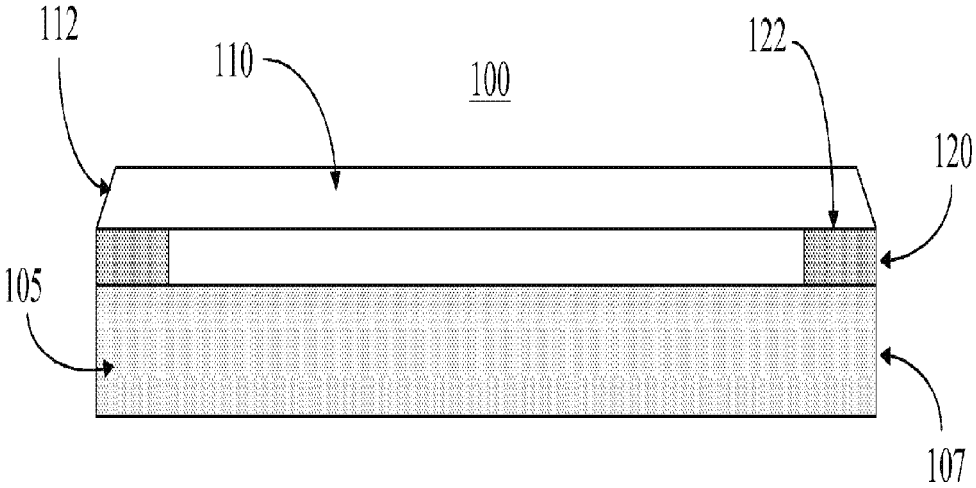

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any sub-ranges therebetween. Unless otherwise specified, all compositions and relationships that include constituents of compositions described herein are expressed in mole percent (mol %).

Referring to the drawings in general, it will be understood that the illustrations are for the purpose of describing particular embodiments and are not intended to limit the disclosure or appended claims thereto. The drawings are not necessarily to scale, and certain features and views of the drawings may be shown exaggerated in scale or in schematic in the interest of clarity and conciseness.

As used herein, the terms "enclosure," "cover plate," and "window" are used interchangeably and refer to glass articles, including windows, cover plates, screens, panels, and substrates, that form the outer portion of a display screen, window, or structure for mobile electronic devices.

Glass is being designed into mobile electronic devices, such as telephones, and entertainment devices, including games, music players and the like; information terminal (IT) devices, such as laptop computers; and analogous stationary versions of such devices.

In some instances, such designs are limited to a flat piece of glass that is protected by a bezel; i.e., a rim that is used to hold and protect a glass window or cover plate in a given device. An example of a glass cover plate or window that is held in place by a bezel is schematically shown in FIG. 1a. Cover plate 110 rests in rim 122 of bezel 120, which holds cover plate 110 in place on body 105 of device 100 and protects the edge 112 of cover plate 110 from sharp impacts.

In order to exploit the crystal-like appearance of glass windows, cover plates, and the like in such devices, designs are being extended to make the glass "proud" of the bezel. The term "proud of the bezel" means that the glass extends to the edge of the device and protrudes above and beyond any bezel or rim of the device. FIG. 1b schematically shows an example of a glass cover plate 110 that is proud of the bezel 120 and is affixed to body 105 of device 100. Glass cover plate 110 is mounted on the surface of bezel 120 such that edges 112 of glass cover plate 110 are exposed and otherwise not covered by bezel 120. Edges 112 of cover plate 110 extend to the edges of 107 of body 105.

The primary limitation to implementing a cover plate or window that is proud of the bezel in such designs is the inability of glass cover plate 110—particularly edges 112—to withstand direct impact, thus necessitating protection of edge 112 of glass cover plate 110 by bezel 120 (FIG. 1a). Furthermore, a glass cover plate 110 that is proud of the bezel 120 (FIG. 1b) will have a greater chance of being scratched during handling and use due to exposure of edge 112 of glass cover plate 110. In order to implement the aforementioned new designs, a glass cover plate must therefore be better able to withstand direct impacts than those glasses that are presently used in such applications. Moreover, a glass must also be resistant to scratching and should have a high retained strength after being scratched or abraded.

The predominant cause of glass breakage in applications such as windshields or cover glass in electronic devices is point contact or sharp impact. To serve as a cover glass or other enclosure in such applications, the crack initiation load of the glass has to be sufficiently high so that it can withstand direct impact. The depth of the surface layers of the glass that are under compressive stress has to be sufficient to provide a high retained strength and increased resistance to damage incurred upon being scratched or abraded.

Accordingly, a glass or glass article that is more resistant to sharp impact and is be able to withstand direct or point impacts is provided. Such glass articles include a windshield or glass enclosure such as, but not limited to, a cover plate, window, casing, screen, touch panel, or the like, for electronic devices. The glass enclosure comprises a strengthened glass which does not exhibit lateral damage such as, but not limited to, chipping when scratched at a rate of 0.4 mm/s with a Knoop diamond that is oriented so that the angle between the leading and trailing edges of the tip of the Knoop diamond is 172°30' at a load of 5 N and, in some embodiments, at a load of 10 N. As used herein, "chipping" refers to the removal or ejection of glass fragments from a surface of a glass when the surface is scratched with an object such as a stylus. As used herein, "chip" can refer to either a glass fragment removed during scratching of the glass surface or the region on the surface from which the chip is removed. In the latter sense, a chip is typically characterized as a depression in the vicinity of the scratch. When scratched, the glass article described herein does not exhibit chipping (i.e., chips are not generated, or the glass is free of chips) beyond a region extending laterally on either side of the scratch track (i.e., the scratch formed by the Knoop diamond) formed for a distance d that is greater than twice the width w of the scratch and, in another embodiment, three times the width w of the scratch. In other words, chipping generated by scratching is limited to a region bordering either side of the scratch track, wherein the width of the region is no greater than twice (in some embodiment, no greater than three times) the width w of the scratch. In one embodiment, the glass enclosure is proud of a bezel, extending above and protruding beyond the bezel, in those instances where a bezel is present. In one embodiment, the glass enclosure has a thickness in a range from about 0.1 mm up to about 2.0 mm. In another embodiment, the glass enclosure has a thickness in a range from about 0.1 mm up to about 2.3 mm and, in other embodiments, the glass enclosure has a thickness of up to about 5.0 mm.

Figure 2:
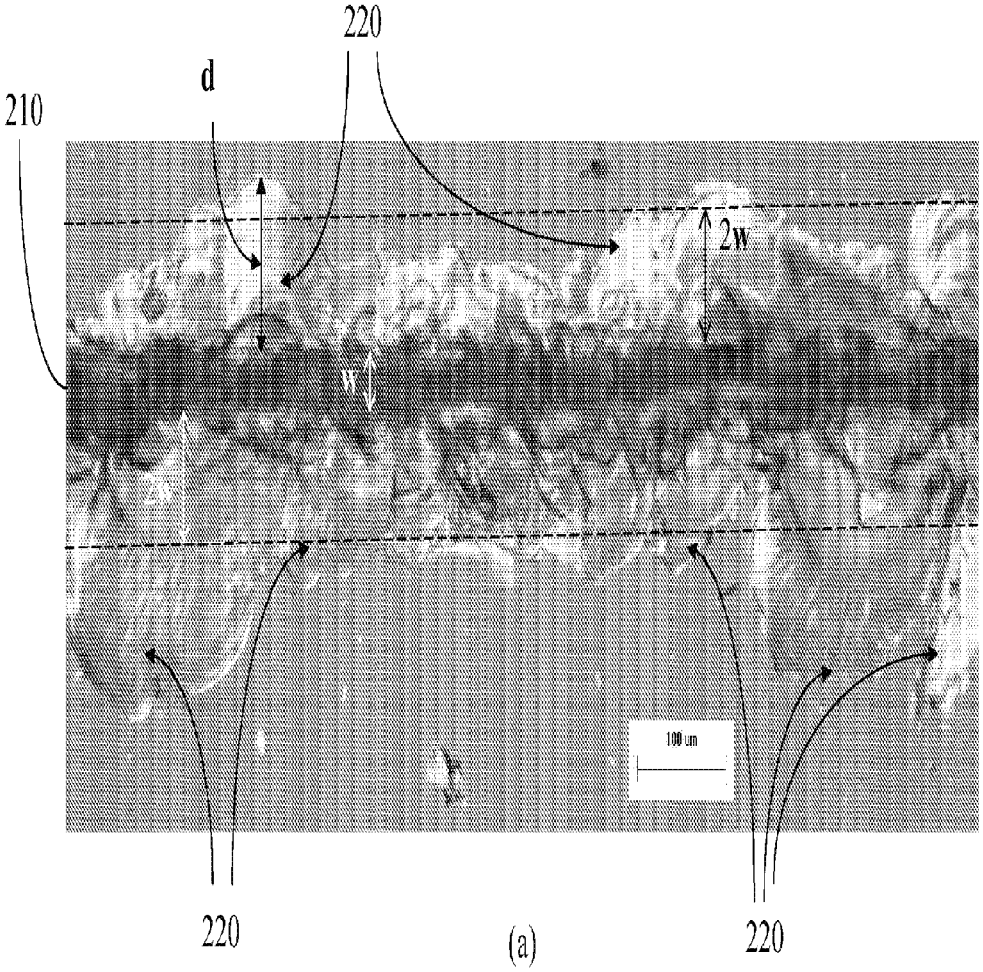
FIG. 2a is a microscopic image of an ion exchanged alkali aluminosilicate glass of the prior art having a scratch formed with a Knoop diamond at a load of 10 N.
FIG. 2b is a microscopic image of a strengthened aluminoborosilicate glass having a scratch formed with a Knoop diamond at a load of 10 N.
Figure 2:
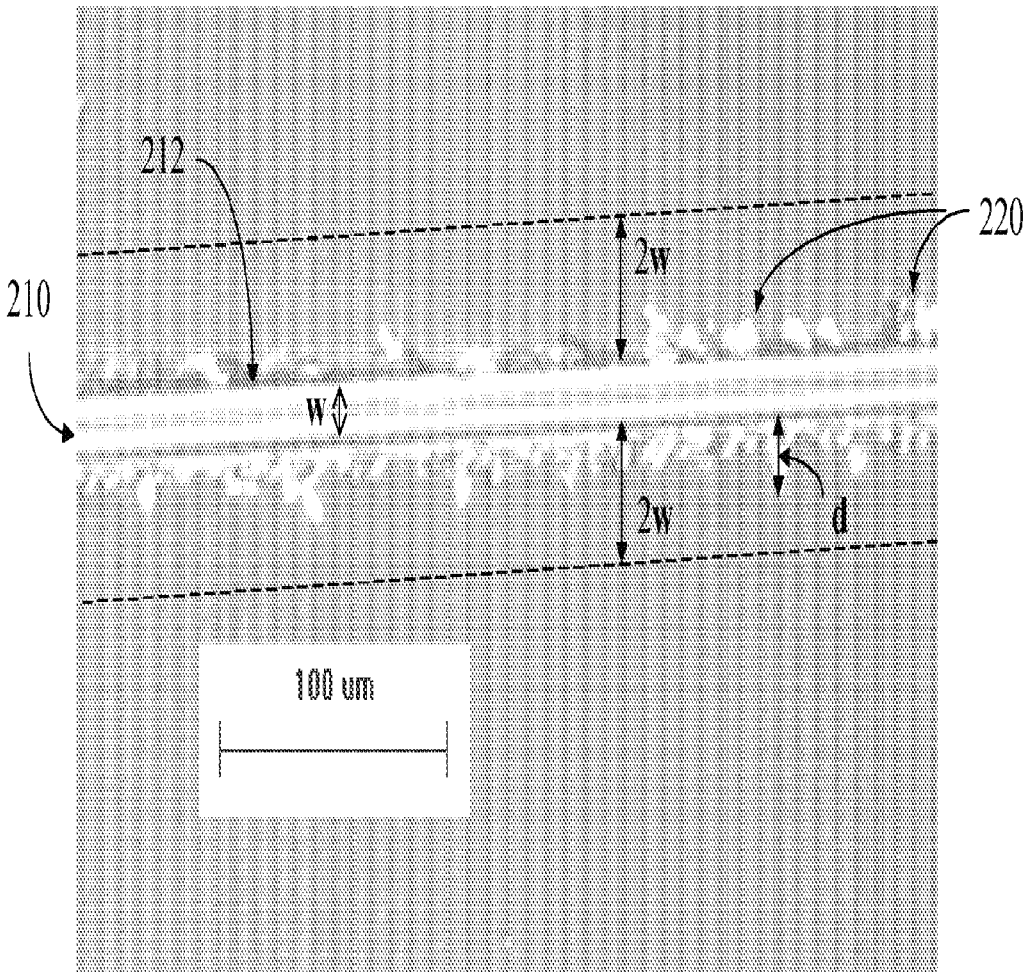

The scratch resistance or response of a glass enclosure to scratching is illustrated in FIG. 2a. The glass shown in FIG. 2a is an alkali aluminosilicate glass having the composition 66 mol % $SiO_2$, 10.3 mol % $Al_2O_3$, 0.6 mol % $B_2O_3$, 14 mol % $Na_2O$, 2.45 mol % $K_2O$, and 0.21 mol % $SnO_2$, wherein the ratio $(Al_2O_3+B_2O_3)/\Sigma$(modifiers), expressed in mol %, is 0.66. The glass was strengthened by ion exchange by immersion in a molten $KNO_3$ salt bath at 410° C. for 8 hrs. FIG. 2a is a microscopic image of the glass having a scratch 210 of width w formed at a rate of 0.4 mm/s with a Knoop diamond at a load of 10 N. Numerous chips 220 are formed along scratch 210, with some chips extending from scratch 210 for a distance d exceeding twice the width w (2w) of scratch 210. In contrast to the behavior of the glass shown in FIG. 2a, the response of the glass enclosure and glasses described herein to scratching is illustrated in FIG. 2b. FIG. 2b is a microscopic image of an aluminoborosilicate glass (64 mol % $SiO_2$, 14.5 mol % $Al_2O_3$, 8 mol % $B_2O_3$, 11.5 mol % $Na_2O$, 0.1 mol % $SnO_2$; wherein the ratio $(Al_2O_3+B_2O_3)/\Sigma$(modifiers), wherein $Al_2O_3$, $B_2O_3$, and $Na_2O$ modifier concentrations are expressed in mol %, is 1.96) that is representative of those aluminoborosilicate glasses described herein. The glass shown in FIG. 2b was ion exchanged by immersion in a molten $KNO_3$ salt bath at 410° C. for 8 hrs. The glass shown in FIG. 2b has a scratch 210 of width w formed with a Knoop diamond at a load of 10 N. The chips 220 formed in the aluminoborosilicate glass shown in FIG. 2b are significantly smaller than those seen in FIG. 2a. In FIG. 2b, chip formation is limited to a zone extending from an edge 212 of scratch 210 to a distance d. The width d of the zone or region in which such chipping occurs is significantly less than 2w. In other words, most of the chips 220 seen in FIG. 2b extend for a distance d, which is less than about width w from crack 210. The glass retains at least 30% of its original load at failure and, in some embodiments, at least 50% of its original load at failure as a determined by ring on ring measurements after scratching with a 3 N Vickers load at a rate of 0.4 mm/s.

The glass enclosures described herein comprise a strengthened glass that deforms upon indentation under an indentation load of at least 500 gf primarily by densification rather than by shear faulting. The glass is free of subsurface faulting and radial and median cracks upon deformation and is consequently more resistant to damage than typical ion-exchangeable glasses. In addition, the glass is more resistant to crack initiation by shear faulting when strengthened by ion exchange. In one embodiment, the glass enclosure comprises an ion exchanged glass and has a Vickers median/radial crack initiation threshold of at least 10 kilogram force (kgf). In a second embodiment, the glass enclosure has a Vickers median/radial crack initiation threshold of at least about 20 kgf and, in a third embodiment, the glass enclosure has a Vickers median/radial crack initiation threshold of at least about 30 kgf. Unless otherwise specified, the Vickers median/radial crack threshold is determined by measuring the onset of median or radial cracks in 50% relative humidity at room temperature.

In another embodiment, the glass enclosures described herein are non-frangible. As used herein, the term "non-frangible" means that the glass enclosures and the glass comprising the glass enclosures do not exhibit forceful fragmentation upon fracture. Such forceful fragmentation is typically characterized by multiple crack branching with ejection or "tossing" of small glass pieces and/or particles from the glass enclosure in the absence of any external restraints, such as coatings, adhesive layers, or the like. More specifically frangible behavior is characterized by at least one of: breaking of the strengthened glass article (e.g., a plate or sheet) into multiple small pieces (e.g., <1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. The glass enclosure and the glass comprising the enclosure are deemed to be substantially non-frangible if they do not exhibit any of the foregoing criteria.

The strengthened glass comprising the glass enclosure can be strengthened by either thermal or chemical processes known in the art. The glass, in one embodiment, can be thermally tempered by heating the glass at a temperature that is between the strain point and the softening point of the glass, followed by cooling to room temperature. In another embodiment, the glass is chemically strengthened by ion exchange in which smaller metal ions in the glass are replaced or "exchanged" by larger metal ions of the same valence within a layer of the glass that extends from the outer surface of the glass to a depth below the surface (commonly referred to as the "depth of layer" or "DOL"). The replacement of smaller ions with larger ions creates a compressive stress within the layer. In one embodiment, the metal ions are monovalent alkali metal ions (e.g., $Na^+$, $K^+$, Rb+, and the like), and ion exchange is accomplished by immersing the glass in a bath comprising at least one molten salt (e.g., $KNO_3$, $K_2SO_4$, KCl, or the like) of the larger metal ion that is to replace the smaller metal ion or ions (e.g., $Na^+$ ions) in the glass. Alternatively, other monovalent cations such as $Ag^+$, $Tl^+$, $Cu^{30}$ , and the like can be exchanged for the alkali metal cations in the glass. The ion exchange process or processes that are used to strengthen the glass can include, but are not limited to, immersion in a single bath or multiple baths of like or different compositions with washing and/or annealing steps between immersions.

Figure 3:
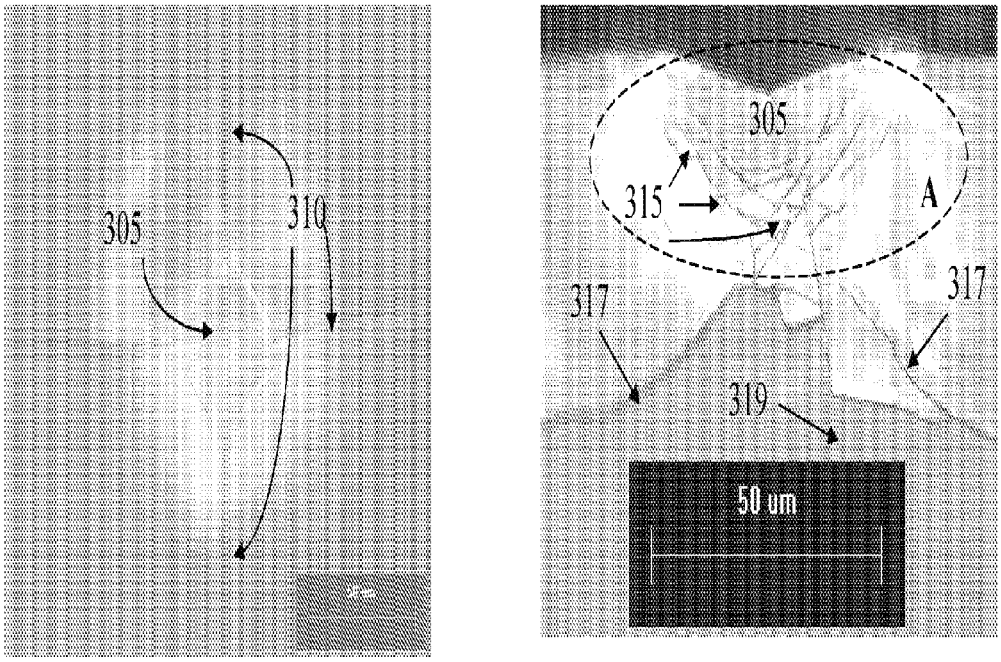
FIG. 3a is a top view of a 1 kilogram force (kgf) Vickers indentation 305 in a soda lime silicate glass of the prior art that had not been ion exchanged.
FIG. 3b is a side or cross-sectional view of a 1 kgf Vickers indentation in a soda lime silicate glass of the prior art that had not been ion exchanged.

The depth of the compressive stress layer (depth of layer) present in ion-exchanged glasses prevents the propagation of flaws at or near the surface of the glass. Glasses such as soda lime silicate and alkali aluminosilicate glasses deform with a high shear band density. Such behavior is known to lead to crack nucleation and propagation in the non-ion exchanged versions of such glasses. An example of shear fault formation and crack initiation is shown in FIGS. 3a and 3b. FIGS. 3a and 3b are top and side (i.e., cross-sectional) views, respectively, of a 1 kilogram force (kgf) Vickers indentation 305 in a soda lime silicate glass that has not been ion exchanged. Radial cracks 310 extend from the Vickers indentation 305 (FIG. 3a) and shear deformation zone A. Lateral cracks 317, median cracks 319, and subsurface shear faults 315 are seen in the side view of the glass (FIG. 3b). Shear faults 315 serve as initiation sites for lateral and median cracks 317, 319.

Figure 4:
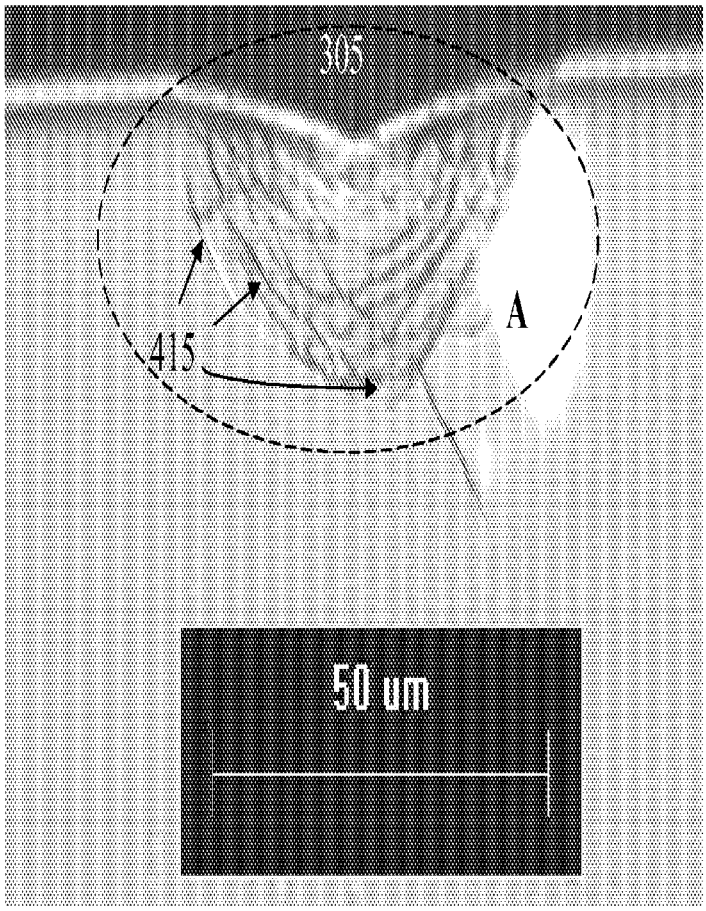
FIG. 4 is a side or cross-sectional view of a 1 kgf Vickers indentation of an ion-exchanged soda lime silicate glass of the prior art.

The compressive stress created in the surface layers of ion exchanged glasses prevents or mitigates the propagation of nucleated cracks, but does not totally eliminate shear deformation. FIG. 4 is a cross-sectional view of a 1 kgf Vickers indentation of an ion-exchanged soda lime silicate glass having a compressive stress of 400 MPa and a depth of layer of 13 μm. Although mitigated, deformation still occurs by the shearing mechanism and leads to crack initiation, as seen in the shear deformation zone A. The compressive layer prevents radial cracks 310 from extending far away from their nucleation sites in the shear deformation zone A. Under flexural loading, subsurface cracks 415 overcome the compressive stress created by ion exchange and propagate into the central tensile region of the glass, thereby causing failure.

Figure 5:
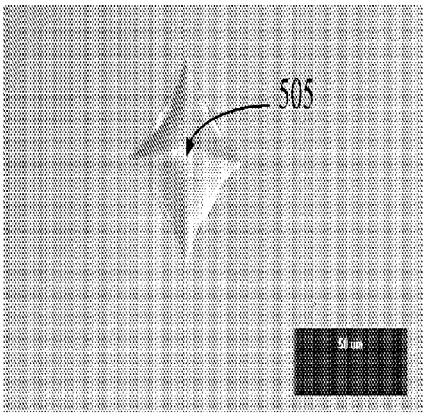
FIG. 5a is a top view of a 1 kgf Vickers indentation in an aluminoborosilicate glass that had not been ion exchanged.
FIG. 5b is a side or cross-sectional view of a 1 kgf Vickers indentation in an aluminoborosilicate glass that had not been ion exchanged.
Figure 5:
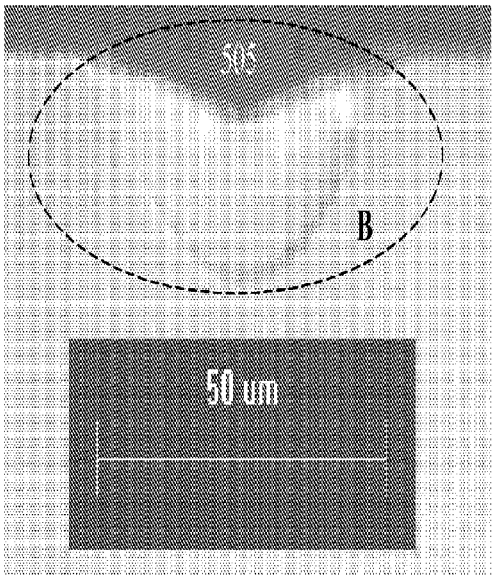
Figure 6:
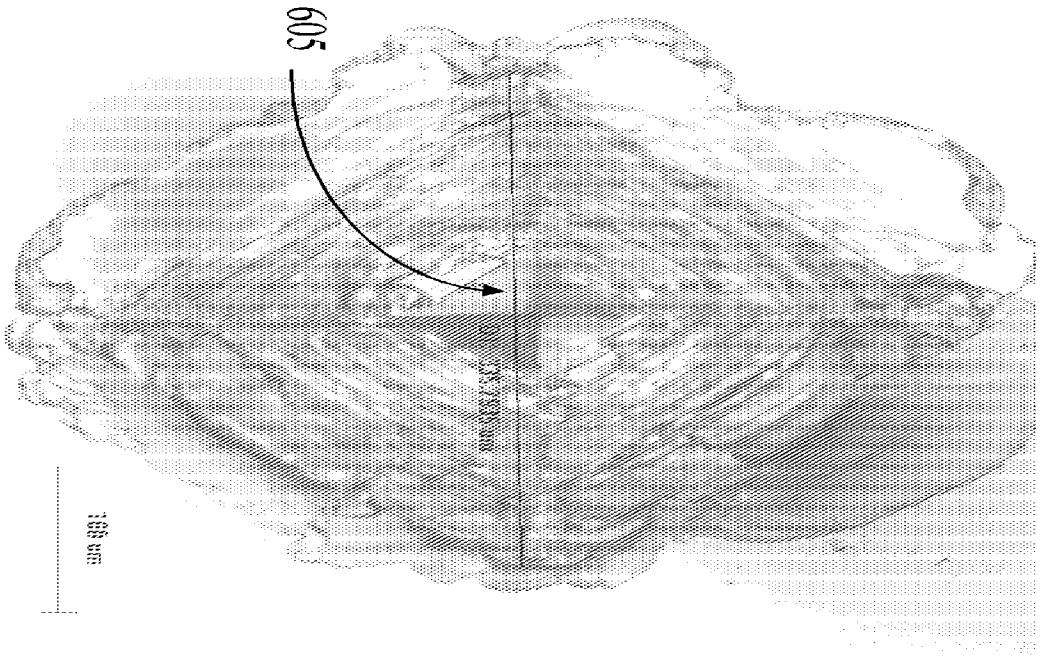
FIG. 6 is top view of a 30 kgf Vickers indentation of a ion exchanged aluminoborosilicate glass.

To improve the mechanical properties of glass enclosures beyond those of currently available ion-exchanged glasses, a glass having higher damage resistance is needed. Accordingly, the glass enclosure described herein comprises an ion-exchanged glass that does not exhibit deformation by subsurface shear faulting, but instead exhibits indentation deformation by densification when submitted to an indentation load of at least 500 gf, which makes flaw/crack initiation more difficult. An example of deformation by densification is shown in FIGS. 5a and 5b, which are top and side views, respectively, of a 1 kilogram force (kgf) Vickers indentation in an alkaline earth aluminoborosilicate (EAGLE XG™, manufactured by Corning, Inc.) glass that has not been strengthened by ion exchange. The top view (FIG. 5a) shows no radial cracks extending from the Vickers indentation 505. As seen in the cross-sectional view (FIG. 5b), the glass deforms primarily by densification (region "B" in FIG. 5b) with no shear faulting. A top view of a 30 kgf Vickers indentation of an aluminoborosilicate glass having the composition: 64 mol % $SiO_2$, 14.5 mol % $Al_2O_3$, 8 mol % $B_2O_3$, 11.5 mol % $Na_2O$, and 0.1 mol % $SnO_2$; wherein the ratio $(Al_2O_3+B_2O_3)/\Sigma$(modifiers), with $Al_2O_3$, $B_2O_3$, and $Na_2O$ modifier concentrations expressed in mol %, is 1.96, and strengthened by ion exchange by immersion in a molten $KNO_3$ salt bath at 410° C. for 8 hours is shown in FIG. 6. At maximum load, the indenter tip has a depth of about 48 μm. No radial cracks extend from Vickers indentation 605.

The densification mechanism described hereinabove can be attributed to the absence or lack of non-bridging oxygens (NBOs) in the glass structure, high molar volume (at least 27 $cm^3$/mol), and low Young's modulus (less than about 69 GPa) of the glass. In the aluminoborosilicate glasses described herein, a structure having substantially no non-bridging oxygens (NBO-free) is achieved through compositions in which the relationship $$\frac{Al_2O_3\ (\text{mol }\%) + B_2O_3\ (\text{mol }\%)}{\sum \text{modifiers (mol }\%)} > 1, \tag{1}$$

where $Al_2O_3$ and $B_2O_3$ are intermediate glass formers and alkali metal (e.g., $Li_2O$, $Na_2O$, $K_2O$, $Rb_2O$, $Cs_2O$) and alkaline earth metal oxides (e.g., MgO, CaO, SrO, BaO) are modifiers, is satisfied. Such modifiers are intentionally or actively included in the glass composition, and do not represent impurities that are inadvertently present in the batched material used to form the glass. To obtain sufficient depth of layer and compressive stress by ion exchange, it is preferable that $0.9<R_2O/Al_2O_3<1.3$, wherein $Al_2O_3$ and $R_2O$ modifier concentrations are expressed in mol %. Given a particular compressive stress and compressive depth of layer, any ion-exchangeable silicate glass composition that obeys equation (1) and contains alkali metals (e.g., $Li^+$, $Na^+$, $K^+$) should have a high resistance to both crack initiation and crack propagation following ion exchange. Prior to ion exchange, such aluminoborosilicate glasses have a Vickers median/radial crack initiation threshold of at least 500 gf and, in one embodiment, the glasses have Vickers median/radial crack initiation threshold of at least 1000 gf.

In some embodiments, the glass enclosure comprises, consists essentially of, or consists of a strengthened glass that, when ion exchanged, is resistant to damage, such as crack initiation and propagation. The glass comprises at least 50 mol % $SiO_2$ in some embodiments, at least 58 mol % $SiO_2$ in some embodiments, at least 60 mol % $SiO_2$ in other embodiments, and includes at least one alkali metal modifier, wherein the ratio $(Al_2O_3+B_2O_3)/\Sigma$(modifiers)>1, wherein $Al_2O_3$, $B_2O_3$, and modifier concentrations are expressed in mol %, and wherein the modifiers are selected from the group consisting of alkali metal oxides and alkaline earth metal oxides. In some embodiments, $(Al_2O_3+B_2O_3)/\Sigma$(modifiers)≥1.45. As the value of this ratio increases, the damage resistance of the glass increases. In addition, an increase in the ratio or a substitution of $B_2O_3$ for $Al_2O_3$ results in a decrease in Young's modulus. In one embodiment, the Young's modulus of the aluminoborosilicate glass is less than about 69 GPa. In one embodiment, the Young's modulus of the aluminoborosilicate glass is less than about 65 GPa. In another embodiment, the Young's modulus of the aluminoborosilicate glass is in a range from about 57 GPa up to about 69 GPa. In another embodiment, the strengthened glass of the glass enclosure has a compressive stress of at least about 400 MPa and a depth of layer of at least about 15 μm, in another embodiment, at least about 25 μm, and, in yet another embodiment, at least about 30 μm.

In one embodiment, the glass enclosure comprises, consists essentially of, or consists of an ion exchangeable aluminoborosilicate glass that has been strengthened, for example, by ion exchange. As used herein, "ion exchangeable" means that a glass is capable of exchanging cations located at or near the surface of the glass with cations of the same valence that are either larger or smaller in size. In a particular embodiment, the aluminoborosilicate glass comprises, consists essentially of, or consists of: 50-72 mol % $SiO_2$; 9-17 mol % $Al_2O_3$; 2-12 mol % $B_2O_3$; 8-16 mol % $Na_2O$; and 0-4 mol % $K_2O$, wherein $(Al_2O_3+B_2O_3)/\Sigma$(modifiers)>1, and has a molar volume of at least 27 $cm^3$/mol. In another embodiment, the aluminoborosilicate glass comprises, consists essentially of, or consists of: 60-72 mol % $SiO_2$; 9-16 mol % $Al_2O_3$; 5-12 mol % $B_2O_3$; 8-16 mol % $Na_2O$; and 0-4 mol % $K_2O$, wherein the ratio of concentrations of $Al_2O_3$ and $B_2O_3$ to the total concentrations of modifiers, $(Al_2O_3+B_2O_3)/\Sigma$(modifiers), is greater than 1, and has a molar volume of at least 27 $cm^3$/mol. In the above embodiments, the modifiers are selected from alkali metal oxides (e.g., $Li_2O$, $Na_2O$, $K_2O$, $Rb_2O$, $Cs_2O$) and alkaline earth metal oxides (e.g., MgO, CaO, SrO, BaO). In some embodiments, the glass further includes 0-5 mol % of at least one of $P_2O_5$, MgO, CaO, SrO, BaO, ZnO, and $ZrO_2$. In other embodiments, the glass is batched with 0-2 mol % of at least one fining agent selected from a group that includes $Na_2SO_4$, NaCl, NaF, NaBr, $K_2SO_4$, KCl, KF, KBr, and $SnO_2$. The aluminoborosilicate glass is, in some embodiments, substantially free of lithium, whereas in other embodiments, the aluminoborosilicate glass is substantially free of at least one of arsenic, antimony, and barium. In other embodiments, the aluminoborosilicate glass is down-drawable by processes known in the art, such as slot-drawing, fusion drawing, re-drawing, and the like, and has a liquidus viscosity of at least 130 kilopoise.

Various non-limiting compositions of the aluminoborosilicate glasses described herein are listed in Table 1. Table 1 also includes properties measured for these glass compositions. Crack initiation thresholds were measured by making multiple indentations (indents) in the glass using a Vickers diamond indenter loaded onto the surface. The load was increased until formation of median or radial cracks extending out from the corners of the indent impression was observed at the surface of the glass in greater than 50% of indents. Crack initiation thresholds for the samples listed in Table 1 are plotted in FIG. 7 as a function of $Al_2O_3+B_2O_3$—$Na_2O$ in the glass samples.

Samples a, b, c, and d in Table 1 have compositions that are nominally free of non-bridging oxygens; i.e., $Al_2O_3+B_2O_3=Na_2O$, or $Al_2O_3+B_2O_3-Na_2O=0$ (i.e. $(Al_2O_3+B_2O_3)/\Sigma$(modifiers)=1). Regardless of whether $B_2O_3$ or $Al_2O_3$ is used to consume the NBOs created by the presence of the $Na_2O$ modifier in these sample compositions, all of the above samples exhibited low (i.e., 100-300 gf) crack initiation thresholds.

Figure 7:
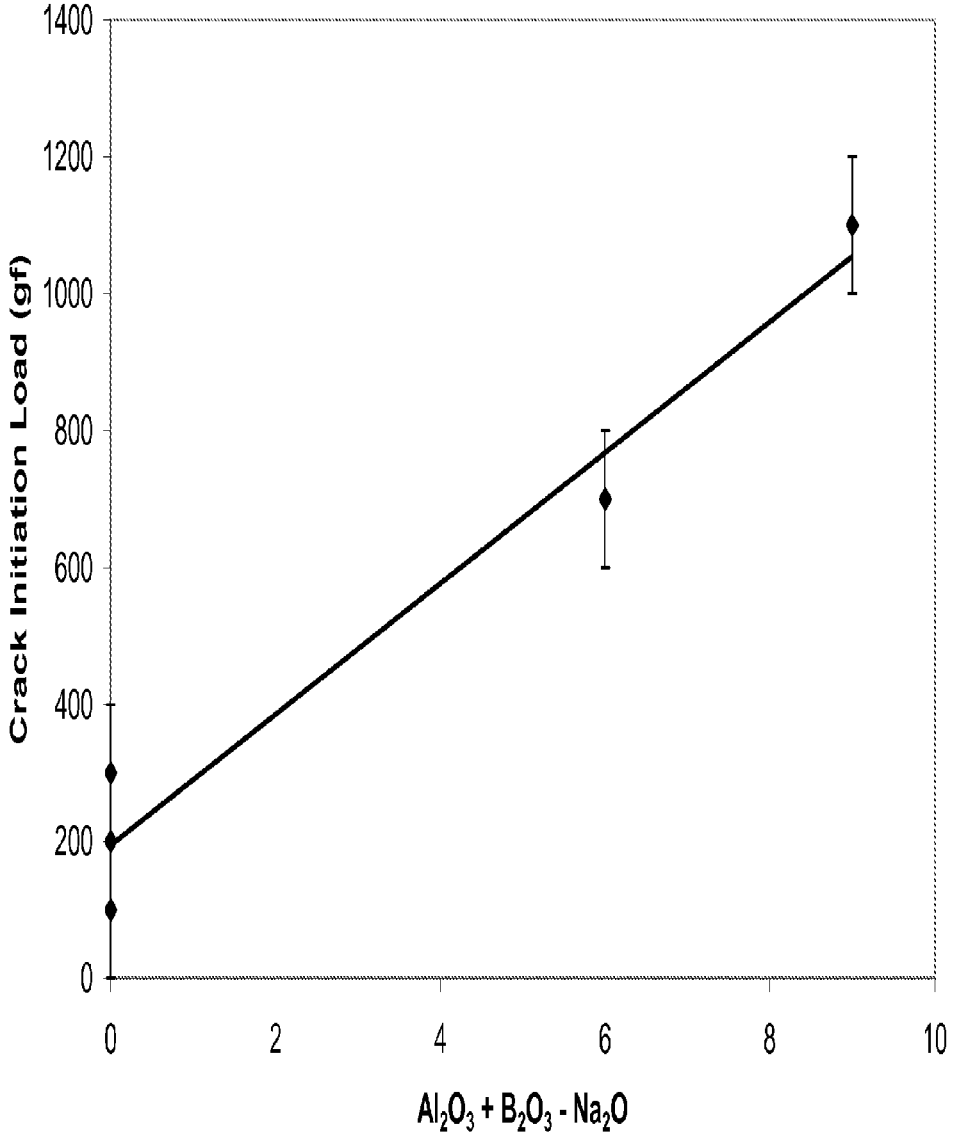
FIG. 7 is a plot of crack initiation thresholds measured of aluminoborosilicate glasses as a function of $Al_2O_3$+$B_2O_3$—$Na_2O$.

In samples e and f, however, an excess of $B_2O_3$ is created by increasing the $Al_2O_3$ content while decreasing the concentration of alkali metal oxide modifiers. For samples e and f, $(Al_2O_3+B_2O_3)/\Sigma$(modifiers)>1. In these samples, the crack initiation threshold increases dramatically, as shown in FIG. 7. Specifically, sample e exhibited a crack initiation threshold of 700 gf prior to strengthening by ion exchange, whereas sample f exhibited a crack initiated threshold of 1000 gf prior to strengthening.

Non-limiting examples of the aluminoborosilicate glasses described herein are listed Table 2, which lists various compositions and properties of glasses. Several compositions (34, 35, 36, 37, 38, and 39), when ion exchanged, have crack initiation thresholds that are less than 10 kgf. These compositions are therefore outside the scope of the disclosure and appended claims and thus serve as comparative examples. Among the properties listed in Table 2 is the coefficient of thermal expansion (CTE), given in units of $1\times10^{-7}/°$ C. CTE is one consideration that is taken into account when designing devices that develop minimal thermal stresses upon temperature changes. Glasses having lower CTEs are desirable for down-draw processes (e.g., fusion-draw and slot-draw) to minimize sheet distortion during the drawing process. The liquidus temperature and corresponding liquidus viscosity (expressed in kP (kilopoise) or MP (megapoise)) indicate the suitability of glass compositions for hot forming the glass into sheets or other shapes. For down-draw processes, it is desirable that the aluminoborosilicate glasses glass described herein have a liquidus viscosity of at least 130 kP. The 200P temperature is the temperature at which the glass has a viscosity of 200 Poise, and is the process temperature typically used in manufacturing to remove gaseous inclusions (fining) and melt any remaining batch materials. The columns labeled 8 and 15 hr DOL and CS in Table 2 are the depth of the compressive layer and the surface compressive stress resulting from ion exchange in 100% $KNO_3$ at 410° C. in 8 and 15 hours, respectively.

To maintain desirable ion exchange properties for the glasses described herein, the total alkali metal oxide modifier concentration should equal that of $Al_2O_3$ and any excess ($Al_2O_3$+$B_2O_3$) that is needed should be made up with $B_2O_3$ alone to increase the crack initiation load. For optimum ion exchange, the aluminoborosilicate glass should the total concentration of alkali metal oxide modifiers should equal that of alumina—i.e., ($Li_2O$+$Na_2O$+$K_2O$+$Rb_2O$+$Cs_2O$)=$Al_2O_3$— to achieve the greatest compressive stress and depth of layer, with excess $B_2O_3$ to improve damage resistance of the glass. However, excess $B_2O_3$ content should be balanced against the rate of ion exchange. For deep (e.g., >20 μm) ion exchange, the $B_2O_3$ concentration should, in some embodiments, be less than that of $Al_2O_3$. To achieve the lowest level of melting defects such as undissolved batch or gaseous inclusions, it is best to that $R_2O/Al_2O_3>1.0$ and, preferably, between $1.05\geq R_2O/Al_2O_3\geq1.2$. Since this condition would create NBOs, given by $R_2O$—$Al_2O_3$, enough $B_2O_3$ should, in some embodiments, be added to consume the excess modifiers (i.e., $B_2O_3>R_2O$—$Al_2O_3$) to maintain damage resistance. More preferably, $B_2O_3>2(R_2O—Al_2O_3)$.

Divalent cations can be added to lower the 200 P temperature (i.e., the typical melting viscosity) of the aluminoborosilicate glass and eliminate defects such as undissolved and/or unmelted batch materials. Smaller divalent cations, such as $Mg^{2+}$, $Zn^{2+}$, or the like are preferable, as they have beneficial impact on the compressive stress developed during ion exchange of the glass. Larger divalent cations such as $Ca^{2+}$, $Sr^{2+}$, and $Ba^{2+}$ decrease the ion exchange rate and the compressive stress achieved by ion exchange. Likewise, the presence of smaller monovalent cations such as $Li^+$ in the glass can have a positive effect on the crack initiation threshold, whereas larger ions such as $K^+$ are not as desirable. In addition, whereas small amounts of $K_2O$ can increase the depth of layer of the compressive stress region, high concentrations of larger monovalent ions such as $K^+$ decrease compressive stress and should therefore be limited to less than 4%.

The aluminoborosilicate glass described herein comprises at least 50 mol %, 58 mol % $SiO_2$ in some embodiments, and in other embodiments, at least 60 mol % $SiO_2$. The $SiO_2$ concentration plays a role in controlling the stability and viscosity of the glass. High $SiO_2$ concentrations raise the viscosity of the glass, making melting of the glass difficult. The high viscosity of high $SiO_2$-containing glasses frustrates mixing, dissolution of batch materials, and bubble rise during fining. High $SiO_2$ concentrations also require very high temperatures to maintain adequate flow and glass quality. Accordingly, the $SiO_2$ concentration in the glass should not exceed 72 mol %.

As the $SiO_2$ concentration in the glass decreases below 60 mol %, the liquidus temperature increases. The liquidus temperature of $SiO_2$—$Al_2O_3$—$Na_2O$ compositions rapidly increases to temperatures exceeding 1500° C. at $SiO_2$ contents of less than 50 mol %. As the liquidus temperature increases, the liquidus viscosity (the viscosity of the molten glass at the liquidus temperature) of the glass decreases. While the presence of $B_2O_3$ suppresses the liquidus temperature, the $SiO_2$ content should be maintained at greater than 50 mol % to prevent the glass from having excessively high liquidus temperature and low liquidus viscosity. In order to keep the liquidus viscosity from becoming too low or too high, the $SiO_2$ concentration of the gasses described herein should therefore be within the range between 50 mol % and 72 mol %, between 58 mol % in some embodiments, and between 60 mol % and 72 mol % in other embodiments.

The $SiO_2$ concentration also provides the glass with chemical durability with respect to mineral acids, with the exception of hydrofluoric acid (HF). Accordingly, the SiO2 concentration in the glasses described herein should be greater than 50 mol % in order to provide sufficient durability.

TABLE 1

Compositions and properties of alkali aluminoborosilicate glasses.

| Mol % | a | b | c | d | e | f |
|---|---|---|---|---|---|---|
| $SiO_2$ | 64 | 64 | 64 | 64 | 64 | 64 |
| $Al_2O_3$ | 0 | 6 | 9 | 15 | 12 | 13.5 |
| $B_2O_3$ | 18 | 12 | 9 | 3 | 9 | 9 |
| $Na_2O$ | 18 | 18 | 18 | 18 | 15 | 13.5 |
| $SnO_2$ | 0.1 | 0.1 | 0.1 | 0.1 | 0.1 | 0.1 |
| $Al_2O_3$ + $B_2O_3$ − $Na_2O$ | 0 | 0 | 0 | 0 | 6 | 9 |
| Strain Point (° C.) | 537 | 527 | 524 | 570 | 532 | 548 |
| Anneal Point (° C.) | 575 | 565 | 564 | 619 | 577 | 605 |
| Softening Point (° C.) | 711 | 713 | 730 | 856 | 770 | 878 |
| Coefficient of Thermal Expansion ($\times10^{-7}$/° C.) | 81.7 | 81.8 | 84.8 | 88.2 | 78 | 74.1 |
| Density (g/cm$^3$) | 2.493 | 2.461 | 2.454 | 2.437 | 2.394 | 2.353 |
| Crack Initiation Load (gf) | 100 | 200 | 200 | 300 | 700 | 1100 |

TABLE 1-continued

Compositions and properties of alkali aluminoborosilicate glasses.

| Mol % | a | b | c | d | e | f |
|---|---|---|---|---|---|---|
| Vickers Hardness at 200 gf | | 511 | 519 | 513 | 489 | 475 |
| Indentation Toughness (MPa m^0.5) | | 0.64 | 0.66 | 0.69 | 0.73 | 0.77 |
| Brittleness (μm^0.5) | | 7.8 | 7.6 | 7.3 | 6.6 | 6 |
| IX at 410° C. for 8 hrs in 100% $KNO_3$ | | | | | | |
| DOL (μm) | 10.7 | 15.7 | 20.4 | 34.3 | 25.6 | 35.1 |
| CS (MPa) | 874 | 795 | 773 | 985 | 847 | 871 |

TABLE 2

Table 2. Compositions, expressed in mol %, and properties of alkali aluminoborosilicate glasses.

| | Composition (mol %) | | | | | | | | | | | |
|---|---|---|---|---|---|---|---|---|---|---|---|---|
| Sample | $SiO_2$ | $Al_2O_3$ | $B_2O_3$ | $Li_2O$ | $Na_2O$ | $K_2O$ | MgO | CaO | $P_2O_5$ | $SnO_2$ | ZnO | $ZrO_2$ |
| 1 | 64.0 | 13.5 | 8.9 | | 13.4 | 0.0 | 0.0 | 0.0 | | 0.10 | | 0.00 |
| 2 | 65.7 | 12.3 | 9.0 | | 11.5 | 1.3 | 0.0 | 0.0 | | 0.10 | | 0.00 |
| 3 | 65.7 | 12.3 | 9.0 | | 9.5 | 3.3 | 0.0 | 0.0 | | 0.10 | | 0.00 |
| 4 | 65.7 | 12.3 | 9.0 | | 12.8 | 0.0 | 0.0 | 0.0 | | 0.10 | | 0.00 |
| 5 | 64.0 | 13.0 | 8.9 | | 13.9 | 0.00 | 0.02 | 0.05 | | 0.10 | | 0.00 |
| 6 | 64.0 | 13.5 | 8.9 | | 13.4 | 0.00 | 0.02 | 0.04 | | 0.10 | | 0.00 |
| 7 | 64.0 | 14.0 | 8.9 | | 12.9 | 0.00 | 0.02 | 0.04 | | 0.10 | | 0.00 |
| 8 | 64.0 | 14.5 | 7.9 | | 13.4 | 0.00 | 0.02 | 0.04 | | 0.10 | | 0.00 |
| 9 | 64.0 | 12.5 | 9.9 | | 13.4 | 0.00 | 0.02 | 0.04 | | 0.10 | | 0.00 |
| 10 | 64.0 | 13.5 | 8.9 | | 11.4 | 2.01 | 0.02 | 0.04 | | 0.10 | | 0.00 |
| 11 | 64.0 | 14.5 | 7.0 | | 14.4 | 0.00 | 0.00 | 0.05 | | 0.10 | | 0.00 |
| 12 | 64.0 | 13.5 | 7.9 | | 13.4 | 0.00 | 1.00 | 0.05 | | 0.10 | | 0.00 |
| 13 | 63.3 | 12.3 | 9.8 | | 12.3 | 0.99 | 0.00 | 0.02 | | 0.15 | | 0.02 |
| 14 | 64.0 | 13.5 | 8.5 | | 14.0 | 0.00 | | | | 0.10 | | |
| 15 | 64.0 | 12.5 | 10.0 | | 13.0 | 0.50 | | | | 0.10 | | |
| 16 | 64.0 | 13.5 | 9.0 | | 12.5 | 1.00 | | | | 0.10 | | |
| 17 | 64.0 | 13.5 | 9.0 | | 13.5 | 0.00 | | | | 0.10 | | |
| 18 | 65.7 | 11.8 | 9.5 | | 11.5 | 1.3 | 0.0 | 0.0 | | 0.05 | | 0.00 |
| 19 | 64.0 | 12.5 | 10.9 | | 12.4 | 0.00 | 0.00 | 0.04 | | 0.10 | | 0.00 |
| 20 | 64.0 | 13.5 | 8.0 | | 14.5 | 0.00 | | | | 0.10 | | |
| 21 | 64.0 | 13.5 | 8.9 | | 13.4 | 0.0 | 0.0 | 0.0 | | 0.10 | | 0.00 |
| 22 | 63.9 | 13.0 | 5.0 | | 11.0 | 3.0 | 4.0 | 0.0 | | 0.10 | | 0.00 |
| 23 | 65.7 | 11.8 | 10.0 | | 11.0 | 1.30 | 0.02 | 0.04 | | 0.05 | | 0.00 |
| 24 | 65.7 | 11.3 | 10.0 | | 11.5 | 1.3 | 0.0 | 0.0 | | 0.05 | | 0.00 |
| 25 | 65.7 | 10.7 | 10.6 | | 11.5 | 1.30 | 0.02 | 0.05 | | 0.05 | | 0.00 |
| 26 | 64.0 | 13.5 | 6.0 | | 13.4 | 0.00 | 3.02 | 0.06 | | 0.10 | | 0.00 |
| 27 | 64.0 | 13.5 | 7.0 | | 15.5 | 0.00 | | | | 0.10 | | |
| 28 | 65.7 | 12.3 | 10.0 | | 10.5 | 1.30 | 0.02 | 0.04 | | 0.05 | | 0.00 |
| 29 | 64.0 | 12.0 | 11.9 | | 11.9 | 0.00 | 0.00 | 0.04 | | 0.10 | | 0.00 |
| 30 | 64.0 | 14.0 | 6.0 | | 11.4 | 2.50 | 2.02 | 0.05 | | 0.10 | | 0.00 |
| 31 | 64.0 | 13.5 | 7.0 | | 13.4 | 0.00 | 2.01 | 0.06 | | 0.10 | | 0.00 |
| 32 | 64.0 | 12.0 | 8.9 | | 14.9 | 0.0 | 0.0 | 0.0 | | 0.10 | | 0.00 |
| 33 | 62.0 | 14.0 | 6.0 | | 12.9 | 3.01 | 2.01 | 0.05 | | 0.10 | | 0.00 |
| 34 | 64.1 | 13.2 | 5.6 | | 12.2 | 2.83 | 1.89 | 0.05 | | 0.09 | | 0.00 |
| 35 | 64.0 | 12.5 | 6.0 | | 12.9 | 2.50 | 2.02 | 0.05 | | 0.10 | | 0.00 |
| 36 | 63.1 | 13.6 | 5.8 | | 12.6 | 2.92 | 1.95 | 0.05 | | 0.10 | | 0.00 |
| 37 | 64.0 | 12.5 | 5.5 | | 14.9 | 3.0 | 0.0 | 0.0 | | 0.10 | | 0.00 |
| 38 | 64.0 | 13.0 | 6.0 | | 12.4 | 2.50 | 2.01 | 0.05 | | 0.10 | | 0.00 |
| 39 | 65.7 | 10.3 | 11.0 | | 11.5 | 1.30 | 0.02 | 0.05 | | 0.05 | | 0.00 |
| 40 | 61.8 | 12.9 | 10.3 | 0.0 | 13.9 | 1.03 | 0.00 | 0.0 | 0.0 | 0.12 | 0.00 | 0.0 |
| 41 | 62.6 | 12.6 | 10.1 | 0.0 | 13.6 | 1.01 | 0.00 | 0.0 | 0.0 | 0.12 | 0.00 | 0.0 |
| 42 | 63.3 | 12.4 | 9.9 | 0.0 | 13.4 | 0.99 | 0.00 | 0.0 | 0.0 | 0.12 | 0.00 | 0.0 |
| 43 | 64.0 | 12.1 | 9.7 | 0.0 | 13.1 | 0.97 | 0.00 | 0.0 | 0.0 | 0.12 | 0.00 | 0.0 |
| 44 | 63.3 | 11.4 | 9.9 | 0.0 | 13.4 | 0.99 | 0.00 | 0.0 | 1.0 | 0.12 | 0.00 | 0.0 |
| 45 | 63.3 | 10.4 | 9.9 | 0.0 | 13.4 | 0.99 | 0.00 | 0.0 | 2.0 | 0.12 | 0.00 | 0.0 |
| 46 | 62.7 | 12.2 | 9.8 | 0 | 12.2 | 0.98 | 1.96 | 0.00 | 0 | 0.12 | 0.00 | 0 |
| 47 | 61.5 | 12.0 | 9.6 | 0 | 12.0 | 0.96 | 3.84 | 0.00 | 0 | 0.12 | 0.00 | 0 |
| 48 | 62.7 | 12.2 | 9.8 | 0 | 12.2 | 0.98 | 0.00 | 0.00 | 0 | 0.12 | 2.0 | 0 |
| 49 | 61.5 | 12.0 | 9.6 | 0 | 12.0 | 0.96 | 0.00 | 0.00 | 0 | 0.12 | 3.8 | 0 |
| 50 | 62.7 | 12.2 | 9.8 | 0 | 12.2 | 0.98 | 0.98 | 0.00 | 0 | 0.12 | 0.98 | 0 |
| 51 | 63.9 | 12.5 | 10.0 | 0 | 12.5 | 1.00 | 0.00 | 0.00 | 0 | 0.12 | 0.00 | 0 |
| 52 | 64.1 | 16.9 | 2.1 | | 15.6 | 1.01 | 0.02 | 0.12 | | 0.10 | | |
| 53 | 64.0 | 16.4 | 2.1 | | 16.3 | 1.01 | 0.02 | 0.13 | | 0.10 | | |
| 54 | 59.9 | 16.5 | 6.6 | | 16.2 | 0.5 | 0.0 | 0.1 | | 0.1 | | 0.0 |
| 55 | 50.5 | 20.2 | 9.8 | | 19.4 | | | | | 0.1 | | |
| 56 | 52.3 | 19.4 | 9.3 | | 18.9 | | | | | 0.1 | | |
| 57 | 55.2 | 20.3 | 9.7 | | 14.6 | | | | | 0.1 | | |

TABLE 2-continued

Table 2. Compositions, expressed in mol %, and properties of alkali aluminoborosilicate glasses.

| Sample | Total | $(R_2O + RO)/(Al_2O_3 + B_2O_3)$ | $R_2O/Al_2O_3$ | $(Al_2O_3 + B_2O_3)/(R_2O + RO)$ | Density g/cm$^3$ | Molar Volume cm$^3$/mol |
|---|---|---|---|---|---|---|
| 1 | 100.0 | 0.602 | 0.997 | 1.661 | 2.353 | 28.44 |
| 2 | 100.0 | 0.606 | 1.046 | 1.651 | 2.347 | 28.47 |
| 3 | 100.0 | 0.606 | 1.046 | 1.651 | 2.345 | 28.77 |
| 4 | 100.0 | 0.605 | 1.045 | 1.652 | 2.346 | 28.31 |
| 5 | 100.0 | 0.639 | 1.074 | 1.564 | 2.363 | 28.23 |
| 6 | 100.0 | 0.602 | 0.997 | 1.661 | 2.355 | 28.41 |
| 7 | 100.0 | 0.567 | 0.926 | 1.764 | 2.335 | 28.74 |
| 8 | 100.0 | 0.602 | 0.929 | 1.661 | 2.363 | 28.45 |
| 9 | 100.0 | 0.602 | 1.076 | 1.662 | 2.354 | 28.29 |
| 10 | 100.0 | 0.602 | 0.998 | 1.660 | 2.356 | 28.67 |
| 11 | 100.0 | 0.676 | 0.997 | 1.480 | 2.376 | 28.27 |
| 12 | 100.0 | 0.676 | 0.997 | 1.479 | 2.369 | 28.12 |
| 13 | 99.00 | 0.601 | 1.077 | 1.665 | 2.346 | 28.41 |
| 14 | 100.1 | 0.636 | 1.037 | 1.571 | | |
| 15 | 100.1 | 0.600 | 1.080 | 1.667 | | |
| 16 | 100.1 | 0.600 | 1.000 | 1.667 | | |
| 17 | 100.1 | 0.600 | 1.000 | 1.667 | | |
| 18 | 100.0 | 0.606 | 1.090 | 1.652 | 2.346 | 28.4 |
| 19 | 100.0 | 0.533 | 0.996 | 1.877 | 2.353 | 28.34 |
| 20 | 100.1 | 0.674 | 1.074 | 1.483 | | |
| 21 | 100.0 | 0.602 | 0.997 | 1.661 | 2.354 | 28.43 |
| 22 | 100.0 | 1.002 | 1.076 | 0.998 | 2.407 | 27.62 |
| 23 | 100.0 | 0.569 | 1.048 | 1.759 | 2.336 | 28.54 |
| 24 | 100.0 | 0.606 | 1.138 | 1.651 | 2.347 | 28.32 |
| 25 | 100.0 | 0.606 | 1.203 | 1.651 | 2.349 | 28.21 |
| 26 | 100.0 | 0.850 | 0.997 | 1.176 | 2.395 | 27.56 |
| 27 | 100.1 | 0.756 | 1.148 | 1.323 | | |
| 28 | 100.0 | 0.533 | 0.964 | 1.875 | 2.331 | 28.68 |
| 29 | 100.0 | 0.502 | 0.997 | 1.994 | 2.326 | 28.62 |
| 30 | 100.0 | 0.804 | 0.998 | 1.244 | 2.392 | 28.11 |
| 31 | 100.0 | 0.758 | 0.996 | 1.319 | 2.385 | 27.81 |
| 32 | 100.0 | 0.717 | 1.246 | 1.395 | 2.394 | 27.7 |
| 33 | 100.0 | 0.903 | 1.141 | 1.108 | 2.418 | 27.89 |
| 34 | 100.0 | 0.903 | 1.141 | 1.108 | 2.409 | 27.82 |
| 35 | 100.0 | 0.949 | 1.237 | 1.053 | 2.414 | 27.61 |
| 36 | 100.0 | 0.903 | 1.141 | 1.108 | 2.411 | 27.88 |
| 37 | 100.0 | 1.002 | 1.438 | 0.998 | 2.444 | 27.5 |
| 38 | 100.0 | 0.897 | 1.151 | 1.115 | 2.406 | 27.78 |
| 39 | 100.0 | 0.606 | 1.249 | 1.651 | 2.431 | 27.21 |
| 40 | 100.0 | 0.644 | 1.160 | 1.552 | 2.358 | |
| 41 | 100.0 | 0.644 | 1.160 | 1.552 | 2.355 | 28.48 |
| 42 | 100.0 | 0.644 | 1.160 | 1.552 | 2.352 | 28.46 |
| 43 | 100.0 | 0.644 | 1.160 | 1.552 | 2.350 | 28.42 |
| 44 | 100.0 | 0.644 | 1.261 | 1.552 | 2.356 | |
| 45 | 100.0 | 0.644 | 1.381 | 1.552 | 2.358 | |
| 46 | 100.0 | 0.689 | 1.080 | 1.452 | 2.369 | 28.03 |
| 47 | 100.0 | 0.778 | 1.080 | 1.286 | 2.386 | 27.62 |
| 48 | 100.0 | 0.600 | 1.080 | 1.667 | 2.395 | 28.06 |
| 49 | 100.0 | 0.600 | 1.080 | 1.667 | 2.432 | 27.75 |
| 50 | 100.0 | 0.644 | 1.080 | 1.552 | 2.383 | 28.04 |
| 51 | 100.0 | 0.600 | 1.080 | 1.667 | 2.354 | 28.04 |
| 52 | 100.0 | 0.877 | 0.979 | 1.141 | 2.425 | 28.07 |
| 53 | 100.0 | 0.940 | 1.052 | 1.064 | 2.433 | 27.89 |
| 54 | 100.0 | 0.727 | 1.013 | 1.375 | 2.399 | 28.32 |
| 55 | 100.0 | 0.647 | 0.960 | 1.546 | 2.412 | 28.97 |
| 56 | 100.0 | 0.659 | 0.974 | 1.519 | 2.413 | 28.73 |
| 57 | 99.9 | 0.487 | 0.719 | 2.055 | 2.399 | 29.09 |

| Sample | Strain pt. (° C.) | Anneal pt. (° C.) | Softening pt. (° C.) | CTE × $10^7$ K$^{-1}$ | Liquidus T (° C.) | Liquidus Viscosity (Mpoise) | 200 poise T (° C.) | Elastic modulus (GPa) | Shear modulus (GPa) |
|---|---|---|---|---|---|---|---|---|---|
| 1 | 548 | 605 | 878 | 74.1 | | | | 62.3 | 25.6 |
| 2 | 543 | 603 | | | | | 1694 | | |
| 3 | 524 | 580 | | | | | | | |
| 4 | 538 | 593 | | | | | 1690 | | |
| 5 | 539 | 590 | 824 | 76.0 | <750 | >1786 | 1680 | 63.4 | 26.1 |
| 6 | 548 | 605 | 864 | 72.8 | <750 | >9706 | 1684 | 62.2 | 25.6 |
| 7 | 559 | 618 | 885 | 69.9 | <750 | | | 62.7 | 25.7 |
| 8 | 566 | 625 | 893 | 72.1 | | | | 63.3 | 26.1 |
| 9 | 528 | 577 | 804 | 74.0 | <730 | >474 | 1650 | 62.9 | 25.7 |
| 10 | 534 | 590 | 864 | 78.4 | <745 | | | 62.3 | 25.8 |
| 11 | 563 | 620 | 900 | 80.0 | <715 | >132346 | 1732 | 64.0 | 26.3 |
| 12 | 546 | 599 | 864 | 74.8 | <715 | >11212 | 1655 | 64.4 | 26.4 |

TABLE 2-continued

Table 2. Compositions, expressed in mol %, and properties of alkali aluminoborosilicate glasses.

| | | | | | | | | | |
|---|---|---|---|---|---|---|---|---|---|
| 13 | 542 | 597 | | 75.4 | | | 1669 | 61.6 | 25.4 |
| 14 | 547 | 600 | | 75.7 | <720 | | | | |
| 15 | 523 | 574 | | | <745 | | | | |
| 16 | 539 | 595 | | | <720 | | | | |
| 17 | 569 | 628 | | | <720 | | | | |
| 18 | 518 | 570 | 820 | 72.8 | | | 1692 | 63.2 | 26.1 |
| 19 | 522 | 578 | 874 | 70.3 | <705 | | | 60.6 | 24.8 |
| 20 | 545 | 596 | | 78.2 | <700 | | | | |
| 21 | 546 | 604 | 871 | 72.0 | <700 | >100 | 1665 | 62.6 | 25.7 |
| 22 | 556 | 608 | 864 | 81.8 | 1115 | | | | |
| 23 | 521 | 575 | 831 | 73.8 | | | | 62.4 | 25.5 |
| 24 | 517 | 568 | 798 | 75.2 | | | 1702 | 64.1 | 26.3 |
| 25 | 513 | 561 | 777 | 73.2 | | | 1663 | 64.6 | 26.6 |
| 26 | 564 | 616 | 872 | 73.0 | 1050 | | | 67.6 | 27.8 |
| 27 | 547 | 594 | | | <745 | | | | |
| 28 | 528 | 587 | 883 | 68.9 | | | | 61.8 | 25.3 |
| 29 | 509 | 563 | 826 | 69.9 | <745 | >663 | 1648 | 59.6 | 24.4 |
| 30 | 557 | 613 | 882 | 79.5 | 975 | 4.72 | 1689 | 67.4 | 27.6 |
| 31 | 550 | 603 | 862 | 75.4 | 945 | | | 66.2 | 27.2 |
| 32 | 532 | 577 | 770 | 78.0 | 865 | | | 67.4 | 27.8 |
| 33 | 538 | 587 | 830 | 87.7 | <710 | | 1614 | 68.8 | 28.3 |
| 34 | 540 | 591 | 839 | 82.1 | <730 | >885 | 1671 | 69.0 | 28.4 |
| 35 | 533 | 581 | 803 | 84.9 | <710 | >518 | 1634 | 69.0 | 28.5 |
| 36 | 538 | 588 | 830 | 85.7 | <720 | >1212 | 1663 | 68.4 | 28.1 |
| 37 | 522 | 564 | 754 | 91.2 | <710 | | | 72.1 | 29.7 |
| 38 | 537 | 586 | 827 | 82.1 | <720 | >1698 | 1653 | 68.1 | 28.2 |
| 39 | 521 | 561 | 739 | 83.7 | 820 | 1.26 | 1480 | 72.5 | 29.9 |
| 40 | 517 | 567 | 805 | 79.4 | <720 | | | 62.7 | |
| 41 | 518 | 569 | 811 | 75.4 | <710 | 1662 | 1668 | 62.7 | |
| 42 | 520 | 572 | 831 | 74.0 | <745 | | | 62.6 | |
| 43 | 519 | 571 | 824 | 76.4 | <700 | 2053 | 1679 | 62.2 | |
| 44 | 508 | 556 | 785 | 76.0 | <710 | | | 63.6 | |
| 45 | 500 | 547 | 785 | 75.7 | <745 | | | 63.5 | |
| 46 | 524 | 573 | 809 | 74.5 | <750 | | | | |
| 47 | 526 | 573 | 791 | 74.8 | | | | | |
| 48 | 507 | 557 | 796 | 74.7 | <700 | | | | |
| 49 | 507 | 554 | 781 | 74.0 | 955 | | | | |
| 50 | 513 | 562 | 795 | 75.4 | <730 | | | | |
| 51 | 489 | 539 | 791 | | <710 | | | | |
| 52 | 666 | 726 | 1016 | 88.8 | <930 | >500 | 1743 | | |
| 53 | 620 | 679 | 969 | 89.3 | 1010 | 8.2 | 1727 | | |
| 54 | 588 | 643 | 905 | 87.4 | 1050 | 0.86 | 1628 | | |
| 55 | 559.0 | 609.0 | 849.5 | 74.4 | | | | | |
| 56 | 559.0 | 610.0 | 841.0 | 92.4 | | | | | |
| 57 | 577.0 | 631.0 | 877.7 | 68.9 | | | | | |

| Sample | Poisson ratio | Pre-IX Crack initiation load (gf) | CS[1] IX 8 hrs (MPa) | DOL[1] IX 8 hrs (μm) | CS[2] IX 15 hrs (MPa) | DOL[2], IX 15 hrs (μm) | Damage Threshold (gf)[3] |
|---|---|---|---|---|---|---|---|
| 1 | 0.219 | 1100 | 871 | 35.1 | | | >30000 |
| 2 | | 600 | | | | | >30000 |
| 3 | | 600 | | | | | 29000 |
| 4 | | 800 | | | | | >30000 |
| 5 | 0.213 | 500-1000 | 803 | 38.8 | 762 | 51.5 | |
| 6 | 0.215 | 500-1000 | 816 | 38.8 | 782 | 51.8 | |
| 7 | 0.219 | 500-1000 | 803 | 36.1 | 761 | 50.5 | |
| 8 | 0.213 | 500-1000 | 868 | 40.3 | 840 | 53.6 | |
| 9 | 0.223 | | 752 | 34.8 | 707 | 47.2 | |
| 10 | 0.209 | | 722 | 47.8 | 687 | 65.1 | |
| 11 | 0.216 | | 924 | 46 | 877 | 60.9 | |
| 12 | 0.219 | | 839 | 36.2 | 790 | 48.8 | |
| 13 | 0.214 | | 775 | 43.5 | 732 | 60.8 | |
| 14 | | | 850 | 38.5 | 792 | 50.7 | |
| 15 | | | 738 | 33.7 | 686 | 47.2 | |
| 16 | | | 763 | 40.7 | 716 | 55.5 | |
| 17 | | | 808 | 40.5 | 757 | 55.4 | |
| 18 | 0.212 | | | | | | 25000 |
| 19 | 0.224 | | 691 | 33.7 | 641 | 46.6 | |
| 20 | | | 868 | 37.1 | 810 | 52.1 | |
| 21 | 0.217 | | 824 | 35.8 | | | |
| 22 | | | 771 | 50.6 | 747 | 66 | |
| 23 | 0.222 | | | | | | 21000 |
| 24 | 0.218 | | | | | | 20000 |
| 25 | 0.216 | | | | | | 20000 |
| 26 | 0.217 | | 887 | 34.8 | 864 | 46.7 | |
| 27 | | | 887 | 34.7 | 835 | 48 | |
| 28 | 0.221 | | | | | | 18000 |

TABLE 2-continued

Table 2. Compositions, expressed in mol %, and properties of alkali aluminoborosilicate glasses.

| | | | | | | | |
|---|---|---|---|---|---|---|---|
| 29 | 0.219 | | 623 | 31.3 | 557 | 43 | |
| 30 | 0.219 | 500-1000 | 791 | 54.1 | 772 | 67.5 | |
| 31 | 0.217 | | 870 | 35.2 | 833 | 46.9 | |
| 32 | 0.21 | 600 | 847 | 25.6 | | | |
| 33 | 0.216 | 500-1000 | 814 | 50.8 | 773 | 67 | |
| 34 | 0.217 | 300-500 | 825 | 46.3 | 792 | 63.6 | |
| 35 | 0.21 | 300-500 | 794 | 45.5 | 750 | 60.6 | |
| 36 | 0.217 | 300-500 | 801 | 51.2 | 779 | 66.2 | |
| 37 | 0.215 | 200-300 | 747 | 43.9 | 698 | 56.5 | |
| 38 | 0.208 | 200-300 | 803 | 46.4 | 761 | 63.3 | |
| 39 | 0.213 | | | | | | 5000 |
| 40 | | | 694 | 38.1 | 668 | 54.2 | |
| 41 | | | 707 | 40.1 | 654 | 50.6 | |
| 42 | | | 690 | 39.9 | 643 | 52.6 | |
| 43 | | | 689 | 38.6 | 627 | 55 | |
| 44 | | | 611 | 37.5 | 555 | 51.2 | |
| 45 | | | 533 | 37.4 | 502 | 50.4 | |
| 46 | | | 806 | 40.1 | 705 | 71.7 | |
| 47 | | | 753 | 27 | 716 | 36.3 | |
| 48 | | | 712 | 29.3 | 670 | 37.2 | |
| 49 | | | 720 | 25 | 688 | 34.8 | |
| 50 | | | 716 | 30.4 | 680 | 39.5 | |
| 51 | | | 574 | 32.5 | 540 | 43.1 | |
| 52 | | | | | | | |
| 53 | | | | | | | |
| 54 | | | 1029 | 51.2 | | | |
| 55 | | | 901 | 38.3 | 858 | 57.5 | 10000-15000 |
| 56 | | | 967 | 37.8 | 964 | 50.7 | 10000-15000 |
| 57 | | | 832 | 18.3 | 790 | 29 | 10000-15000 |

| Sample | Damage Threshold (gf)[4] | Damage Threshold (gf)[5] | Damage Threshold (gf) |
|---|---|---|---|
| 1 | | | 30 |
| 2 | | | 30 |
| 3 | | | 29 |
| 4 | | | 30 |
| 5 | >30000 | | 30 |
| 6 | >30000 | | 30 |
| 7 | >30000 | | 30 |
| 8 | >30000 | | 30 |
| 9 | >30000 | | 30 |
| 10 | >30000 | | 30 |
| 11 | >30000 | | 30 |
| 12 | >30000 | | 30 |
| 13 | >30000 | | 30 |
| 14 | >30000 | | 30 |
| 15 | >30000 | | 30 |
| 16 | >30000 | | 30 |
| 17 | >30000 | | 30 |
| 18 | | | 25 |
| 19 | 25000 | | 25 |
| 20 | 25000 | | 25 |
| 21 | | 23000 | 23 |
| 22 | 20000-25000 | | 22 |
| 23 | | | 21 |
| 24 | | | 20 |
| 25 | | | 20 |
| 26 | 20000 | | 20 |
| 27 | <25000 | | 20 |
| 28 | | | 18 |
| 29 | 18000 | | 18 |
| 30 | 15000 | | 15 |
| 31 | 13000 | | 13 |
| 32 | | 11000 | 11 |
| 33 | 10000 | | 10 |
| 34 | 9000 | | 9 |
| 35 | 8000 | | 8 |
| 36 | 8000 | | 8 |
| 37 | 6000 | | 6 |
| 38 | 6000 | | 6 |
| 39 | | | 5 |
| 40 | 19000 | | 19 |
| 41 | 22000 | | 22 |
| 42 | >30000 | | 30 |
| 43 | | | |

TABLE 2-continued

Table 2. Compositions, expressed in mol %, and properties of alkali aluminoborosilicate glasses.

| | | |
|---|---|---|
| 44 | 20000-25000 | 22.5 |
| 45 | | |
| 46 | 15000-20000 | 17.5 |
| 47 | >30000 | >30 |
| 48 | >30000 | >30 |
| 49 | >30000 | >30 |
| 50 | >30000 | >30 |
| 51 | 20000-25000 | 22.5 |
| 52 | | 13.5 |
| 53 | | 11.5 |
| 54 | 10000-15000 | 12.5 |
| 55 | 10000-15000 | 12.5 |
| 56 | <10000 | 12.5 |
| 57 | 10000-15000 | 12.5 |

[1]Compressive stress (CS) and depth of layer (DOL) after ion exchange (IX) in 100% $KNO_3$ at 410° C. for 8 hrs.
[3]Compressive stress (CS) and depth of layer (DOL) after ion exchange (IX) in 100% $KNO_3$ at 410° C. for 15 hrs.
[3]After ion exchange (IX) in 100% $KNO_3$ at 410° C. for 8 hrs.
[4]After ion exchange (IX) in 100% $KNO_3$ at 410° C. for 15 hrs.
[5]After ion exchange (IX) in 100% $KNO_3$ at 370° C. for 64 hrs.

Example

The following example illustrates features and advantages of the glasses described herein, and is in no way intended to limit the disclosure or appended claims thereto.

The purpose of this example was to verify that pre-ion exchange crack resistance improves post-ion exchange crack resistance in a glass. Samples of crack resistant aluminoborosilicate glass having composition e in Table 1 (64 mol % $SiO_2$, 13.5 mol % $Al_2O_3$, 9 mol % $B_2O_3$, 13.5 mol % $Na_2O$, 0.1 mol % $SnO_2$) and a pre-ion exchange crack initiation threshold of 1100 gram force (gf), were ion exchanged by immersion in a molten $KNO_3$ salt bath at 410° C. for 8 hrs to achieve depths of layer DOL and compressive stresses CS. One sample had a DOL of 55.8 μm and a CS of 838 MPa, and another sample had a DOL of 35.1 μm and a CS of 871 MPa.

For purposes of comparison, samples of Corning GORILLA™ Glass (an alkali aluminosilicate glass having the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$) with a pre-ion exchange crack initiation threshold of 300 gf were then ion exchanged to closely match the compressive stress and depths of layer of the samples having composition f, listed in Table 1. One sample had a DOL of 54 μm and a CS of 751 MPa, and another sample had a DOL of 35 μm and a CS of 790 MPa. Compressive stresses and depths of layer of the ion exchanged samples of composition f and GORILLA Glass are listed in Table 3.

Following ion exchange, Vickers crack initiation loads were measured for each of composition f in Table 1 and the GORILLA Glass samples. Post-ion exchange crack initiation loads were measured using a Vickers diamond indenter as previously described herein and are listed in Table 3. The results of the crack initiation testing listed in Table 3 demonstrate that greater pre-ion exchange crack resistance improves post-ion exchange crack resistance. The GORILLA Glass samples required loads of 5,000-7,000 gf to initiate median/radial crack systems, whereas the composition f samples required loads of greater than 30,000 gf, or 4-6 times the load needed to initiate such cracks in GORILLA Glass samples, to initiate median/radial crack systems. The GORILLA Glass samples fractured into several pieces when the indentation load exceeded the measured crack initiation loads, and in all cases fracture was observed by the point at which the load exceeded 10,000 gf. In contrast, the composition f samples did not fracture at any of the indentation loads (3,000 up to 30,000 gf) studied.

TABLE 3

Crack initiation loads of ion-exchanged glasses having composition f (listed in Table 1) and Gorilla ® Glasses.

| Glass | Pre-Ion-Exchange Crack Initiation Load (gf) | DOL (microns) | Compressive Stress (MPa) | Post-Ion-Exchange Crack Initiation Load (gf) |
|---|---|---|---|---|
| Comp. f | 1100 | 55.8 | 838 | 30000+ |
| Gorilla Glass | 300 | 54 | 751 | 7000 |
| Comp. f | 1100 | 35.1 | 871 | 30000+ |
| Gorilla Glass | 300 | 35 | 790 | 5000 |

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass comprising:

at least 58 mol % $SiO_2$;

at least 8 mol % $Na_2O$;

5.5-12 mol % $B_2O_3$; and $Al_2O_3$;

wherein a ratio $$\frac{Al_2O_3\ (\text{mol }\%) + B_2O_3\ (\text{mol }\%)}{\sum \text{modifiers (mol }\%)} > 1,$$

the modifiers are one or more alkali metal oxide ($R_2O$) and one or more alkaline earth oxide (RO);

wherein $Al_2O_3$ (mol %)>$B_2O_3$ (mol %) and $0.9<R_2O/Al_2O_3<1.3$, wherein the glass is substantially free of $Li_2O$, *and wherein the glass has a Vickers crack initiation threshold of at least 10 kgf when ion exchange is carried out.*

2. The glass of claim 1, wherein the glass is ion exchanged and has a layer under a compressive stress of at least about 600 MPa, the layer extending from a surface of the glass into the glass to a depth of layer of at least about 30 μm.

3. The glass of claim 2, wherein the compressive stress is at least about 800 MPa.

4. The glass of claim 2, wherein the glass has a Vickers crack initiation threshold of at least about 30 kgf.

5. The glass of claim 1, wherein the glass is defined by the equation $$\frac{Al_2O_3\ (mol\ \%) + B_2O_3\ (mol\ \%)}{\sum modifiers\ (mol\ \%)} \geq 1.45.$$

6. The glass of claim 1, wherein the glass comprises from about 60 to 72 mol % $SiO_2$, about 9 mol % to about 17 mol % $Al_2O_3$, and [about] 8 mol % to about 20 mol % $Na_2O$.

7. The glass of claim 1, wherein the glass comprises at least one of MgO, ZnO, CaO, SrO, and BaO.

8. The glass of claim 1, wherein the glass comprises 5.5-10 mol % $B_2O_3$.

9. The glass of claim 1, wherein the glass comprises from 0 mol % to about 4 mol % $K_2O$.

10. The glass of claim 1, wherein the glass is defined by the following equation $-5.7$ mol %$<\Sigma$ modifiers$-Al_2O_3<2.99$ mol %.

11. The glass of claim 1, wherein the glass is defined by the following equation $1.0<R_2O/Al_2O_3<1.3$.

12. The glass of claim 1, wherein the glass has a Young's modulus of less than about 69 GPa.

13. A glass comprising:
at least 58 mol % $SiO_2$;
at least 8 mol % $Na_2O$;
2-12 mol % $B_2O_3$; and
$Al_2O_3$;
wherein a ratio $$\frac{Al_2O_3\ (mol\ \%) + B_2O_3\ (mol\ \%)}{\sum modifiers\ (mol\ \%)} > 1,$$

the modifiers are one or more alkali metal oxide ($R_2O$) and one or more alkaline earth oxide (RO);

wherein $0.9<R_2O/Al_2O3<1.3$, $Al_2O_3$ (mol %)>$B_2O_3$ (mol %), and wherein the glass is defined by the following equation $-5.7$ mol %$<\Sigma$ modifiers$-Al_2O_3<2.17$ mol %.

14. The glass of claim 13, wherein the glass is defined by the equation $$\frac{Al_2O_3\ (mol\ \%) + B_2O_3\ (mol\ \%)}{\sum modifiers\ (mol\ \%)} \geq 1.45.$$

15. The glass of claim 13, wherein the glass comprises from about 60 to 72 mol % $SiO_2$, about 9 mol % to about 17 mol % $Al_2O_3$, and [about] 8 mol % to about 20 mol % $Na_2O$.

16. The glass of claim 13, wherein the glass comprises at least one of MgO, ZnO, CaO, SrO, and BaO.

17. The glass of claim 13, wherein the glass comprises 3-10 mol % $B_2O_3$.

18. The glass of claim 13, wherein the glass is defined by the following equation $1.0<R_2O/Al_2O_3<1.3$.

19. The glass of claim 13, wherein the glass has a Young's modulus of less than about 69 GPa.

20. A glass comprising:
at least 58 mol % $SiO_2$;
at least 8 mol % $Na_2O$;
2-10 mol % $B_2O_3$;
$Al_2O_3$; and
wherein a ratio $$\frac{Al_2O_3\ (mol\ \%) + B_2O_3\ (mol\ \%)}{\sum modifiers\ (mol\ \%)} > 1,$$

the modifiers are one or more alkali metal oxide ($R_2O$) and one or more alkaline earth oxide (RO);

wherein $0.9<R_2O/Al_2O_3<1.3$, and wherein the glass is defined by the following equation $-5.7$ mol %$<\Sigma$ modifiers$-Al_2O_3<2.17$ mol %.

21. The glass of claim 20, wherein the glass is defined by the equation $$\frac{Al_2O_3\ (mol\ \%) + B_2O_3\ (mol\ \%)}{\sum modifiers\ (mol\ \%)} \geq 1.45.$$

22. The glass of claim 20, wherein the glass comprises from about 60 to 72 mol % $SiO_2$, about 9 mol % to about 17 mol % $Al_2O_3$, and [about] 8 mol % to about 20 mol % $Na_2O$.

23. The glass of claim 20, wherein the glass comprises at least one of MgO, ZnO, CaO, SrO, and BaO.

24. The glass of claim 20, wherein the glass comprises 3-10 mol % $B_2O_3$.

25. The glass of claim 20, wherein the glass is defined by the following equation $1.0<R_2O/Al_2O_3<1.3$.

*26. An aluminoborosilicate glass comprising:*
*at least 58 mol % $SiO_2$;*
*9-17 mol % $Al_2O_3$;*
*2-12 mol % $B_2O_3$;*
*8-16 mol % $Na_2O$; and*
*>0-2 mol % $Sn0_2$,*
*wherein*

$$\frac{Al_2O_3\ (mol\ \%) + B_2O_3\ (mol\ \%)}{\sum modifiers\ (mol\ \%)} > 1,$$

*wherein the modifiers are one or more alkali metal oxide ($R_2O$) and one or more alkaline earth metal oxide (RO),*
*wherein $1<R_2O$ (mol %)/$Al_2O_3$ (mol %)$<1.3$,*
*wherein the glass is substantially free of lithium,*
*wherein the glass is ion exchanged and has a layer under a compressive stress of at least 600 MPa, the layer extending from a surface of the glass into the glass to a depth of layer of at least 30 μm, and*
*wherein the glass has a Vickers crack initiation threshold of at least 10 kgf.*

*27. The aluminoborosilicate glass of claim 26, wherein the compressive stress is at least 800 MPa.*

*28. The aluminoborosilicate glass of claim 26, wherein the aluminoborosilicate glass has a Vickers crack initiation threshold of at least 30 kgf.*

*29. The aluminoborosilicate glass of claim 26, wherein the aluminoborosilicate glass is defined by the equation*

$$\frac{Al_2O_3\ (mol\ \%) + B_2O_3\ (mol\ \%)}{\sum modifiers\ (mol\ \%)} \geq 1.45.$$

*30. The aluminoborosilicate glass of claim 26, wherein the aluminoborosilicate glass comprises from about 60 to 72 mol % $SiO_2$.*

*31. The aluminoborosilicate glass of claim 26, wherein the aluminoborosilicate glass comprises at least one of MgO, ZnO, CaO, SrO, and BaO.*

*32. The aluminoborosilicate glass of claim 26, wherein the aluminoborosilicate glass comprises 5.5-10 mol % $B_2O_3$.*

*33. The aluminoborosilicate glass of claim 26, wherein the aluminoborosilicate glass comprises from 0 mol % to about 4 mol % $K_2O$.*

*34. The aluminoborosilicate glass of claim 26, wherein the aluminoborosilicate glass is defined by the equation $-5.7$ mol $\% < \Sigma modifiers - Al_2O_3 < 2.99$ mol %.*

*35. The aluminoborosilicate glass of claim 26, wherein the aluminoborosilicate glass has a Young's modulus of less than about 69 GPa.*

* * * * *